US012542882B2

United States Patent
Aoki et al.

(10) Patent No.: US 12,542,882 B2
(45) Date of Patent: Feb. 3, 2026

(54) IMAGE PROCESSING APPARATUS, IMAGE PROCESSING METHOD, AND PROGRAM

(71) Applicant: FUJIFILM Corporation, Tokyo (JP)

(72) Inventors: Takashi Aoki, Saitama (JP); Masahiko Miyata, Saitama (JP); Kenkichi Hayashi, Saitama (JP); Yasunori Murakami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 185 days.

(21) Appl. No.: 18/448,992

(22) Filed: Aug. 14, 2023

(65) Prior Publication Data

US 2023/0388471 A1 Nov. 30, 2023

Related U.S. Application Data

(63) Continuation of application No. PCT/JP2022/005745, filed on Feb. 14, 2022.

(30) Foreign Application Priority Data

Feb. 26, 2021 (JP) .................................. 2021-031212

(51) Int. Cl.
*H04N 13/117* (2018.01)
*G06F 3/01* (2006.01)
(Continued)

(52) U.S. Cl.
CPC ........... *H04N 13/117* (2018.05); *G06F 3/013* (2013.01); *G06F 3/14* (2013.01); *G06T 7/20* (2013.01)

(58) Field of Classification Search
CPC .......... H04N 13/117; G06F 3/013; G06F 3/14; G06T 7/20
See application file for complete search history.

(56) References Cited

U.S. PATENT DOCUMENTS 10,855,967 B2 12/2020 Aizawa
2013/0311308 A1* 11/2013 Huang ............... G06Q 30/0275
705/14.73

(Continued)

FOREIGN PATENT DOCUMENTS

| AU | 2011218691 | 9/2011 |
| JP | 2012048639 | 3/2012 |

(Continued)

OTHER PUBLICATIONS

"Search Report of Europe Counterpart Application", issued on Jun. 13, 2024, pp. 1-11.

(Continued)

*Primary Examiner* — Yu Chen
(74) *Attorney, Agent, or Firm* — JCIPRNET

(57) ABSTRACT

An image processing apparatus includes a processor and a memory connected to or built in the processor. The processor acquires a virtual viewpoint image showing an aspect of a subject in a case in which the subject is observed from a viewpoint specified by viewpoint information based on a plurality of captured images and the viewpoint information, and outputs, based on the viewpoint information, data for displaying a specific image created in a process different from a process of the virtual viewpoint image, and the virtual viewpoint image on a display.

19 Claims, 25 Drawing Sheets

(51) Int. Cl.
*G06F 3/14* (2006.01)
*G06T 7/20* (2017.01)

(56) References Cited

U.S. PATENT DOCUMENTS

| | | | | |
|---|---|---|---|---|
| 2014/0059588 | A1* | 2/2014 | Sakamoto | H04N 21/472 |
| | | | | 725/32 |
| 2014/0278847 | A1* | 9/2014 | Gallo | G06Q 30/0252 |
| | | | | 705/14.5 |
| 2018/0084287 | A1* | 3/2018 | Shimura | G06F 3/0484 |
| 2018/0246631 | A1 | 8/2018 | Maruyama | |
| 2018/0288394 | A1* | 10/2018 | Aizawa | H04N 5/2628 |
| 2019/0199997 | A1* | 6/2019 | Mizuno | G06T 7/50 |
| 2019/0253743 | A1* | 8/2019 | Tanaka | H04N 21/812 |
| 2020/0106968 | A1 | 4/2020 | Shuden et al. | |
| 2020/0202610 | A1 | 6/2020 | Takama | |
| 2021/0383430 | A1* | 12/2021 | Chijimatsu | A63F 13/65 |
| 2022/0051469 | A1* | 2/2022 | Yoneda | H04N 13/117 |
| 2022/0182559 | A1* | 6/2022 | Ito | H04N 21/26258 |

FOREIGN PATENT DOCUMENTS

| | | |
|---|---|---|
| JP | 2018142164 | 9/2018 |
| JP | 2018180654 | 11/2018 |
| JP | 2018180655 | 11/2018 |
| JP | 2020028096 | 2/2020 |
| JP | 2020101847 | 7/2020 |
| JP | 2020119262 | 8/2020 |
| WO | 2018051747 | 3/2018 |
| WO | 2019021375 | 1/2019 |

OTHER PUBLICATIONS

"International Search Report (Form PCT/ISA/210) of PCT/JP2022/005745," mailed on May 10, 2022, with English translation thereof, pp. 1-5.

"Written Opinion of the International Searching Authority (Form PCT/ISA/237) of PCT/JP2022/005745," mailed on May 10, 2022 with English translation thereof, pp. 1-9.

"Notice of Reasons for Refusal of Japan Counterpart Application", issued on Aug. 12, 2025, with English translation thereof, p. 1-p. 6.

* cited by examiner

IMAGE PROCESSING APPARATUS, IMAGE PROCESSING METHOD, AND PROGRAM

CROSS-REFERENCE TO RELATED APPLICATIONS

This application is a continuation application of International Application No. PCT/JP2022/005745 filed Feb. 14, 2022, the disclosure of which is incorporated herein by reference in its entirety. Further, this application claims priority under 35 USC 119 from Japanese Patent Application No. 2021-031212 Feb. 26, 2021, the disclosure of which is incorporated by reference herein.

BACKGROUND

1. Technical Field

The technology of the present disclosure relates to an image processing apparatus, an image processing method, and a program.

2. Related Art

JP2018-142164A discloses an image processing apparatus provided in a system that generates, based on a plurality of captured images obtained by imaging a subject from different directions by a plurality of cameras and information according to a designation of a virtual viewpoint, a virtual viewpoint image in which a virtual object that is not included in the plurality of captured images is inserted, the image processing apparatus including an acquisition unit that acquires viewpoint information for specifying a movement route of the virtual viewpoint related to generation of the virtual viewpoint image, and a control unit that decides a display region that is a display region in the virtual viewpoint image corresponding to a virtual viewpoint at a first point in time on the movement route specified from the viewpoint information acquired by the acquisition unit and that displays the virtual object based on the virtual viewpoint at the first point in time and the virtual viewpoint, which is the virtual viewpoint on the movement route, at a second point in time different from the first point in time. JP2018-142164A discloses that the virtual object is an object for displaying an advertisement on the virtual viewpoint image.

JP2020-101847A discloses an image file generation apparatus that generates an image file for generating a virtual viewpoint image, the image file generation apparatus comprising a material information acquisition unit that acquires material information used for the generation of the virtual viewpoint image, an additional information acquisition unit that acquires additional information to be displayed on the virtual viewpoint image, and an image file generation unit that generates the image file including the material information and the additional information.

JP2012-048639A discloses free viewpoint video generation apparatus comprising a holding unit that holds data of a subject and a background for generating a free viewpoint video, a generation unit that generates a video seen from a received viewpoint by using the data held in the holding unit, a decision unit that decides a region in which a desired advertisement is inserted from a background region of the video generated by the generation unit, and a combination unit that generates a video in which the desired advertisement is attached to the region in which the advertisement is inserted in the video generated by the generation unit.

SUMMARY

One embodiment according to the technology of the present disclosure provides an image processing apparatus, an image processing method, and a program which can show a specific image to a viewer of a virtual viewpoint image.

A first aspect according to the technology of the present disclosure relates to an image processing apparatus comprising a processor, and a memory connected to or built in the processor, in which the processor acquires a virtual viewpoint image showing an aspect of a subject in a case in which the subject is observed from a viewpoint specified by viewpoint information based on a plurality of captured images and the viewpoint information, and outputs data for displaying a specific image created in a process different from a process of the virtual viewpoint image, and the virtual viewpoint image on a display based on the viewpoint information.

A second aspect according to the technology of the present disclosure relates to an image processing apparatus comprising a processor, and a memory connected to or built in the processor, in which the processor acquires a virtual viewpoint image showing an aspect of a subject in a case in which the subject is observed from a viewpoint specified by viewpoint information based on a plurality of captured images and the viewpoint information, and outputs data for displaying a specific image created without using the plurality of captured images, and the virtual viewpoint image on a display based on the viewpoint information.

A third aspect according to the technology of the present disclosure relates to an image processing apparatus comprising a processor, and a memory connected to or built in the processor, in which the processor acquires a virtual viewpoint image showing an aspect of a subject in a case in which the subject is observed from a viewpoint specified by viewpoint information based on a plurality of captured images and the viewpoint information, and outputs data for displaying the virtual viewpoint image on a display and outputs data for displaying a specific image on the display at a timing which is decided according to the viewpoint information.

A fourth aspect according to the technology of the present disclosure relates to the image processing apparatus according to any one of the first to third aspects, in which the viewpoint information includes a time parameter related to a time, and the data includes first data for displaying the virtual viewpoint image on the display and for displaying the specific image on the display according to the time parameter.

A fifth aspect according to the technology of the present disclosure relates to the image processing apparatus according to any one of the first to fourth aspects, in which the viewpoint information includes setting completion information indicating that setting of the viewpoint information is completed, and the data includes second data for displaying the virtual viewpoint image on the display and for displaying the specific image on the display during a period from completion of the setting of the viewpoint information to displaying of the virtual viewpoint image on the display according to the setting completion information.

A sixth aspect according to the technology of the present disclosure relates to the image processing apparatus according to any one of the first to fifth aspects, in which the data includes third data for displaying the virtual viewpoint image on the display and for displaying the specific image on the display according to a timing at which continuity of the viewpoint information is interrupted.

A seventh aspect according to the technology of the present disclosure relates to the image processing apparatus according to any one of the first to sixth aspects, in which the viewpoint information includes viewpoint path information indicating a viewpoint path for observing the subject, and the data includes fourth data for displaying the virtual viewpoint image on the display and for displaying the specific image on the display at an interval at which the viewpoint path indicated by the viewpoint path information is divided.

An eighth aspect according to the technology of the present disclosure relates to the image processing apparatus according to any one of the first to seventh aspects, in which the viewpoint information includes required time information indicating a required time which is required for a first viewpoint for observing the subject to move from a first position to a second position different from the first position, and the data includes fifth data for displaying the virtual viewpoint image on the display and for displaying the specific image on the display at an interval at which the required time indicated by the required time information is divided.

A ninth aspect according to the technology of the present disclosure relates to the image processing apparatus according to any one of the first to eighth aspects, in which the viewpoint information includes elapsed time information indicating a position of a second viewpoint for observing the subject and an elapsed time corresponding to the position of the second viewpoint, and the data includes sixth data for displaying the virtual viewpoint image on the display and for displaying the specific image on the display at a timing which is decided according to a relationship between the elapsed time and the position of the second viewpoint indicated by the elapsed time information.

A tenth aspect according to the technology of the present disclosure relates to the image processing apparatus according to any one of the first to ninth aspects, in which the viewpoint information includes movement speed information for specifying a movement speed of a position of a third viewpoint for observing the subject, and the data includes seventh data for displaying the virtual viewpoint image on the display and for displaying the specific image on the display at a timing at which the movement speed specified from the movement speed information is equal to or lower than a threshold value.

An eleventh aspect according to the technology of the present disclosure relates to the image processing apparatus according to any one of the first to tenth aspects, in which the viewpoint information includes angle-of-view information related to an angle of view for observing the subject, and the data includes eighth data for displaying the virtual viewpoint image on the display and for displaying the specific image on the display at a timing which is decided according to the angle-of-view information.

A twelfth aspect according to the technology of the present disclosure relates to the image processing apparatus according to any one of the first to eleventh aspects, in which the data includes ninth data for displaying the virtual viewpoint image on the display and for displaying the specific image on the display at a timing at which displaying of the virtual viewpoint image on the display is started, or ninth data for displaying the virtual viewpoint image on the display and for displaying the virtual viewpoint image on the display at a timing at which displaying of the specific image on the display ends.

A thirteenth aspect according to the technology of the present disclosure relates to the image processing apparatus according to the twelfth aspect, in which the processor outputs tenth data for displaying a reception screen for receiving the viewpoint information on the display, and outputs the data including the ninth data on a condition that reception of the viewpoint information by the reception screen is completed.

A fourteenth aspect according to the technology of the present disclosure relates to the image processing apparatus according to any one of the first to thirteenth aspects, in which the processor further acquires gaze point information for specifying a position of a gaze point, and controls a display timing of the specific image according to a fluctuation state of the gaze point specified from the gaze point information.

A fifteenth aspect according to the technology of the present disclosure relates to an image processing method comprising acquiring a virtual viewpoint image showing an aspect of a subject in a case in which the subject is observed from a viewpoint specified by viewpoint information based on a plurality of captured images generated by imaging the subject by a plurality of imaging apparatuses and the viewpoint information, and outputting data for displaying a specific image created in a process different from a process of the virtual viewpoint image, and the virtual viewpoint image on a display based on the viewpoint information.

A sixteenth aspect according to the technology of the present disclosure relates to an image processing method comprising acquiring a virtual viewpoint image showing an aspect of a subject in a case in which the subject is observed from a viewpoint specified by viewpoint information based on a plurality of captured images and the viewpoint information, and outputting, based on the viewpoint information, data for displaying a specific image created without using the plurality of captured images, and the virtual viewpoint image on a display based on the viewpoint information.

A seventeenth aspect according to the technology of the present disclosure relates to an image processing method comprising acquiring a virtual viewpoint image showing an aspect of a subject in a case in which the subject is observed from a viewpoint specified by viewpoint information based on a plurality of captured images generated by imaging the subject by a plurality of imaging apparatuses and the viewpoint information, outputting data for displaying the virtual viewpoint image on a display, and outputting data for displaying a specific image on the display at a timing which is decided according to the viewpoint information.

An eighteenth aspect according to the technology of the present disclosure relates to a program causing a computer to execute a process comprising acquiring a virtual viewpoint image showing an aspect of a subject in a case in which the subject is observed from a viewpoint specified by viewpoint information based on a plurality of captured images generated by imaging the subject by a plurality of imaging apparatuses and the viewpoint information, and outputting data for displaying a specific image created in a process different from a process of the virtual viewpoint image and the virtual viewpoint image on a display based on the viewpoint information.

A nineteenth aspect according to the technology of the present disclosure relates to a program causing a computer to execute a process comprising acquiring a virtual viewpoint image showing an aspect of a subject in a case in which the subject is observed from a viewpoint specified by viewpoint information based on a plurality of captured images and the viewpoint information, and outputting data for displaying a specific image created without using the plurality of captured images and the virtual viewpoint image on a display based on the viewpoint information.

A twentieth aspect according to the technology of the present disclosure relates to a program causing a computer to execute a process comprising acquiring a virtual viewpoint image showing an aspect of a subject in a case in which the subject is observed from a viewpoint specified by viewpoint information based on a plurality of captured images generated by imaging the subject by a plurality of imaging apparatuses and the viewpoint information, and outputting data for displaying the virtual viewpoint image on a display and outputting data for displaying a specific image on the display at a timing which is decided according to the viewpoint information.

BRIEF DESCRIPTION OF THE DRAWINGS

Exemplary embodiments of the technology of the disclosure will be described in detail based on the following figures, wherein.

DETAILED DESCRIPTION

An example of an embodiment of an image processing apparatus, an image processing method, and a program according to the technology of the present disclosure will be described with reference to the accompanying drawings.

First, the terms used in the description below will be described.

CPU refers to an abbreviation of "central processing unit". GPU refers to an abbreviation of "graphics processing unit". TPU refers to an abbreviation of "tensor processing unit". NVM refers to an abbreviation of "non-volatile memory". RAM refers to an abbreviation of "random access memory". SSD refers to an abbreviation of "solid state drive". HDD refers to an abbreviation of "hard disk drive". EEPROM refers to an abbreviation of "electrically erasable and programmable read only memory". OF refers to an abbreviation of "interface". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electroluminescence". LAN refers to an abbreviation of "local area network". USB refers to an abbreviation of "universal serial bus". HMD refers to an abbreviation of "head mounted display". LTE refers to an abbreviation of "long term evolution". 5G refers to an abbreviation of "5th generation (wireless technology for digital cellular networks)". TDM refers to an abbreviation of "time-division multiplexing".

Figure 1:
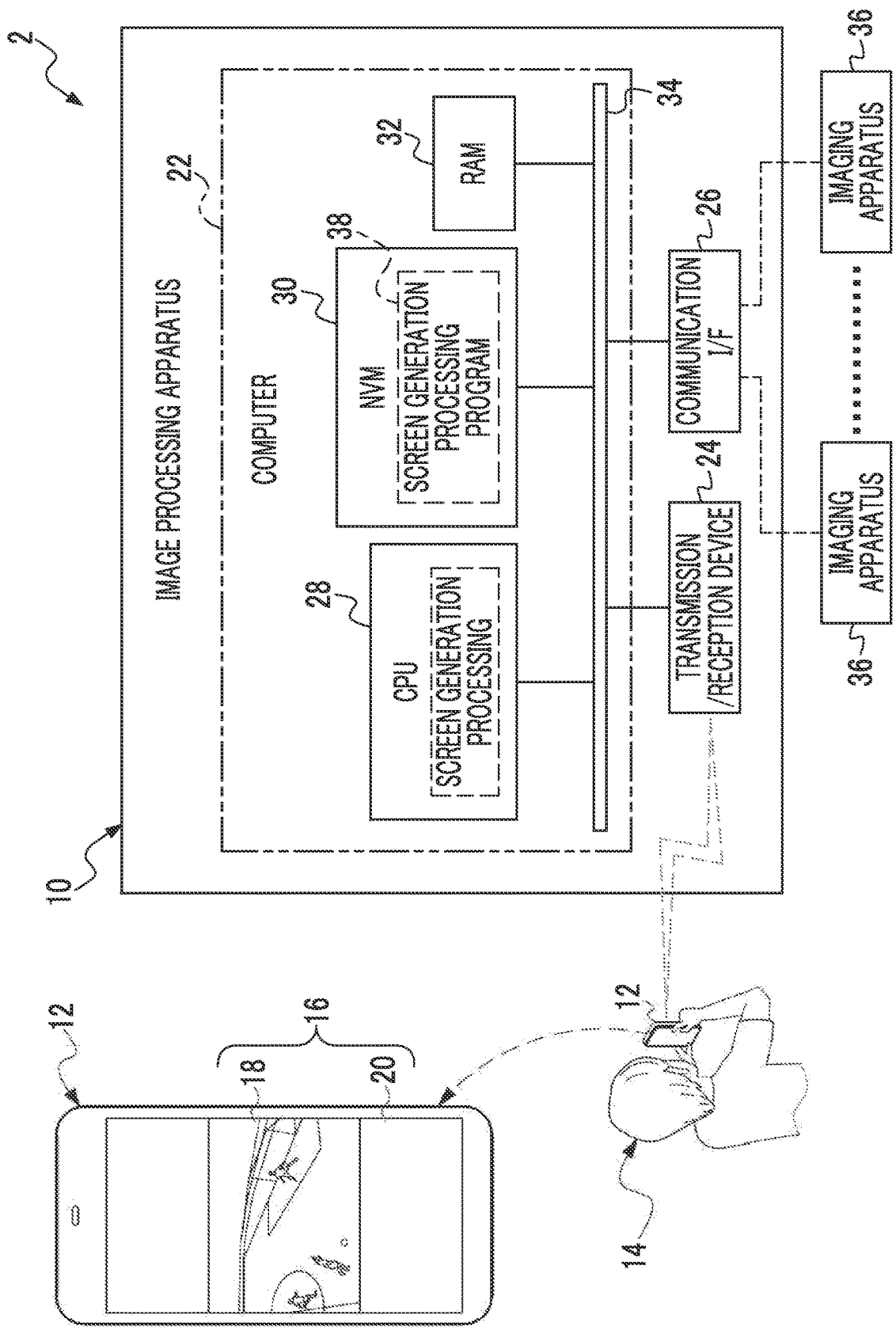
FIG. 1 is a conceptual diagram showing an example of a configuration of an image processing system.

As an example, as shown in FIG. 1, an image processing system 2 comprises an image processing apparatus 10 and a user device 12.

In the present embodiment, a server is applied as an example of the image processing apparatus 10. The server is realized by a main frame, for example. It should be noted that this is merely an example, and for example, the server may be realized by network computing, such as cloud computing, fog computing, edge computing, or grid computing. In addition, the image processing apparatus 10 may be a personal computer, a plurality of personal computers, a plurality of servers, a combination of the personal computer and the server, and the like.

Moreover, in the present embodiment, a smartphone is applied as an example of the user device 12. It should be noted that the smartphone is merely an example, and, for example, a personal computer may be applied, or a portable multifunctional terminal, such as a tablet terminal or a head mounted display (hereinafter, referred to as an "HMD"), may be applied. In addition, in the present embodiment, the image processing apparatus 10 and the user device 12 are connected in a communicable manner via, for example, a base station (not shown). The communication standards used in the base station include a wireless communication standard including a 5G standard and/or an LTE standard, a wireless communication standard including a WiFi (802.11) standard and/or a Bluetooth (registered trademark) standard, and a wired communication standard including a TDM standard and/or an Ethernet (registered trademark) standard.

The image processing apparatus 10 acquires an image, and transmits the acquired image to the user device 12. Here, the image refers to, for example, a captured image 64 (see FIG. 3, FIG. 4, FIG. 8, and the like) obtained by being captured and an image generated based on the captured image 64 (see FIG. 3, FIG. 4, FIG. 8, and the like). Examples of the image generated based on the captured image (see FIG. 3, FIG. 4, FIG. 8, and the like) include a virtual viewpoint image 76 (see FIG. 8 and the like).

The user device 12 is used by a user 14. The user device 12 comprises a touch panel display 16. The touch panel display 16 is realized by a display 18 and a touch panel 20. Examples of the display 18 include an EL display (for example, an organic EL display or an inorganic EL display). It should be noted that the display is not limited to the EL display, and another type of display, such as a liquid crystal display, may be applied.

The touch panel display 16 is formed by superimposing the touch panel 20 on a display region of the display 18 or by forming an in-cell type in which a touch panel function is built in the display 18. It should be noted that the in-cell type is merely an example, and an out-cell type or an on-cell type may be applied.

The user device 12 executes processing according to an instruction received from the user 14 by the touch panel 20 and the like. For example, the user device 12 exchanges various types of information with the image processing apparatus 10 in response to the instruction received from the user 14 by the touch panel 20 and the like.

The user device 12 receives the image transmitted from the image processing apparatus 10, and displays the received image on the display 18. The user 14 views the image displayed on the display 18.

The image processing apparatus 10 comprises a computer 22, a transmission/reception device 24, and a communication OF 26. The computer 22 is an example of a "computer" according to the technology of the present disclosure, and comprises a CPU 28, an NVM 30, and a RAM 32. The image processing apparatus 10 comprises a bus 34, and the CPU 28, the NVM 30, and the RAM 32 are connected via the bus 34. In the example shown in FIG. 1, one bus is shown as the bus 34 for convenience of illustration, but a plurality of buses may be used. In addition, the bus 34 may include a serial bus, or a parallel bus configured by a data bus, an address bus, a control bus, and the like.

The CPU 28 is an example of a "processor" according to the technology of the present disclosure. The CPU 28 controls the entire image processing apparatus 10. Various parameters and various programs are stored in the NVM 30. Examples of the NVM 30 include an EEPROM, an SSD, and/or an HDD. The RAM 32 is an example of a "memory" according to the technology of the present disclosure. Various types of information are transitorily stored in the RAM 32. The RAM 32 is used as a work memory by the CPU 28.

The transmission/reception device 24 is connected to the bus 34. The transmission/reception device 24 is a device including a communication processor (not shown), an antenna, and the like, and transmits and receives various types of information to and from the user device 12 via the base station (not shown) under the control of the CPU 28. That is, the CPU 28 exchanges various types of information with the user device 12 via the transmission/reception device 24.

The communication OF 26 is realized by a device including an FPGA, for example. The communication OF 26 is connected to a plurality of imaging apparatuses 36 via a LAN cable (not shown). The imaging apparatus 36 is an imaging device including a CMOS image sensor, and has an optical zoom function and/or a digital zoom function. It should be noted that, instead of the CMOS image sensor, another type of image sensor, such as a CCD image sensor, may be adopted.

The plurality of imaging apparatuses 36 are installed, for example, in a soccer stadium (not shown) and image a subject inside the soccer stadium. The captured image 64 (see FIG. 3, FIG. 4, FIG. 8, and the like) obtained by imaging the subject by the imaging apparatus 36 is used, for example, for the generation of the virtual viewpoint image 76 (see FIG. 8 and the like). Therefore, the plurality of imaging apparatuses 36 are installed at different locations inside the soccer stadium, respectively, that is, at locations at which a plurality of captured images 64 (see FIG. 3, FIG. 4, FIG. 8, and the like) for generating virtual viewpoint images 76 (see FIG. 8 and the like) are obtained. The soccer stadium is a three-dimensional region including a soccer field (not shown) and a spectator seat (not shown) that is constructed to surround the soccer field, and is an observation target of the user 14. An observer, that is, the user 14, can observe the inside of the soccer stadium from the spectator seat or a place outside the soccer stadium through the image displayed by the display 18 of the user device 12.

It should be noted that, here, as an example, the soccer stadium is described as an example as the place in which the plurality of imaging apparatuses 36 are installed, but the technology of the present disclosure is not limited to this. The place in which the plurality of imaging apparatuses 36 are installed may be any place as long as the place is a place in which the plurality of imaging apparatuses 36 can be installed, such as a baseball field, a rugby field, a curling field, an athletic field, a swimming pool, a concert hall, an outdoor music field, and a theater.

The communication I/F 26 is connected to the bus 34, and controls the exchange of various types of information between the CPU 28 and the plurality of imaging apparatuses 36. For example, the communication I/F 26 controls the plurality of imaging apparatuses 36 in response to a request from the CPU 28. The communication I/F 26 outputs the captured image 64 (see FIG. 3, FIG. 4, FIG. 8, and the like) obtained by being captured by each of the plurality of imaging apparatuses 36 to the CPU 28. It should be noted that, here, although the communication I/F 26 is described as an example of a wired communication I/F, a wireless communication I/F, such as a high-speed wireless LAN, may be applied.

The NVM 30 stores a screen generation processing program 38. The screen generation processing program 38 is an example of a "program" according to the technology of the present disclosure. The CPU 28 performs screen generation processing (see FIG. 20) by reading out the screen generation processing program 38 from the NVM 30 and executing the screen generation processing program 38 on the RAM 32.

Figure 2:
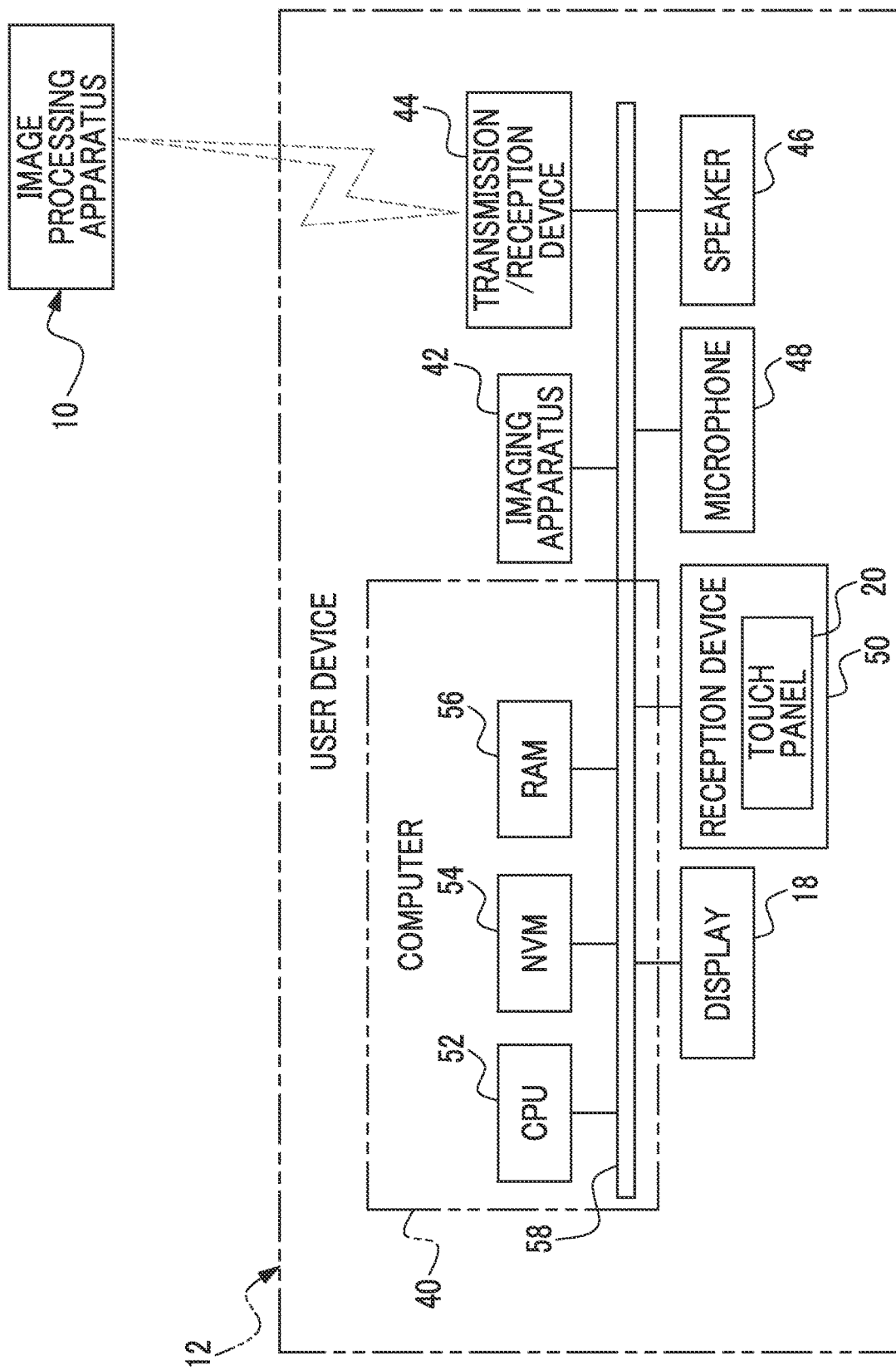
FIG. 2 is a block diagram showing an example of a hardware configuration of an electric system of a user device.

As shown in FIG. 2 as an example, the user device 12 comprises the display 18, a computer 40, an imaging apparatus 42, a transmission/reception device 44, a speaker 46, a microphone 48, and a reception device 50. The computer 40 comprises a CPU 52, an NVM 54, and a RAM 56. The user device 12 comprises a bus 58, and the CPU 52, the NVM 54, and the RAM 56 are connected via the bus 58.

In the example shown in FIG. 2, one bus is shown as the bus 58 for convenience of illustration, but a plurality of buses may be used. In addition, the bus 58 may include a serial bus or a parallel bus configured by a data bus, an address bus, a control bus, and the like.

The CPU 52 controls the entire user device 12. Various parameters and various programs are stored in the NVM 54. Examples of the NVM 54 include an EEPROM. Various types of information are transitorily stored in the RAM 56. The RAM 56 is used as a work memory by the CPU 52. By reading out various programs from the NVM 54 and executing the various programs on the RAM 56, the CPU 52 performs processing according to the various programs.

The imaging apparatus 42 is an imaging device including a CMOS image sensor, and has an optical zoom function and/or a digital zoom function. It should be noted that, instead of the CMOS image sensor, another type of image sensor, such as a CCD image sensor, may be adopted. The imaging apparatus 42 is connected to the bus 58, and the CPU 52 controls the imaging apparatus 42. The captured image obtained by the imaging with the imaging apparatus 42 is acquired by the CPU 52 via the bus 58.

The transmission/reception device 44 is connected to the bus 58. The transmission/reception device 44 is a device including a communication processor (not shown), an antenna, and the like, and transmits and receives various types of information to and from the image processing apparatus 10 via the base station (not shown) under the control of the CPU 52. That is, the CPU 52 exchanges various types of information with the image processing apparatus 10 via the transmission/reception device 44.

The speaker 46 converts an electric signal into the sound. The speaker 46 is connected to the bus 58. The speaker 46 receives the electric signal output from the CPU 52 via the bus 58, converts the received electric signal into the sound, and outputs the sound obtained by the conversion from the electric signal to the outside of the user device 12.

The microphone 48 converts the collected sound into the electric signal. The microphone 48 is connected to the bus 58. The CPU 52 acquires the electric signal obtained by the conversion from the sound collected by the microphone 48 via the bus 58.

The reception device 50 receives an instruction from the user 14 or the like. Examples of the reception device 50 include the touch panel 20 and a hard key (not shown). The reception device 50 is connected to the bus 58, and the instruction received by the reception device 50 is acquired by the CPU 52.

Figure 3:
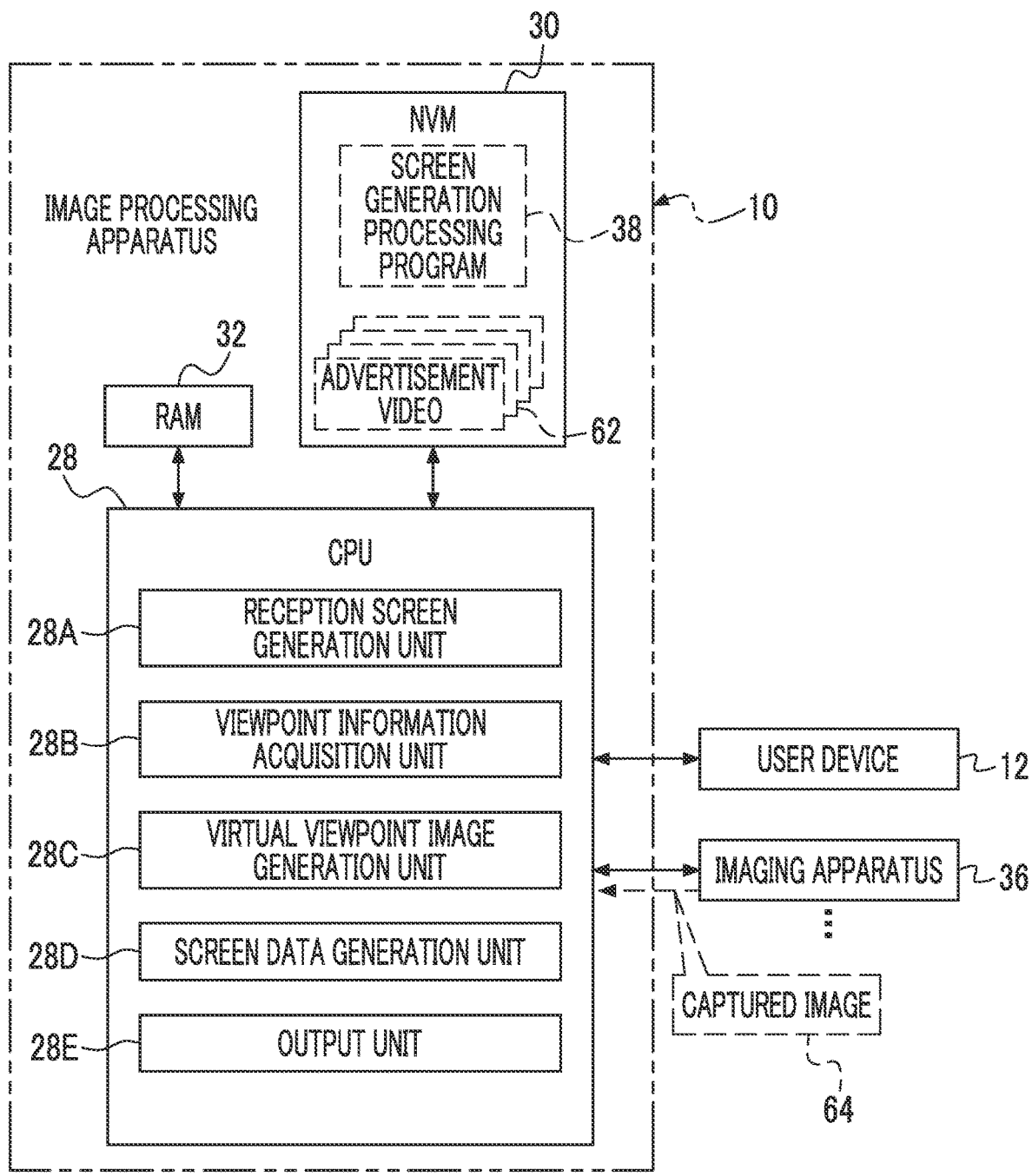
FIG. 3 is a block diagram showing an example of a function of a main unit of a CPU of an image processing apparatus.

As an example, as shown in FIG. 3, a plurality of advertisement videos 62 are stored in the NVM 30 of the image processing apparatus 10. The advertisement video 62 is a video created in a process different from a process of the virtual viewpoint image 76 (see FIG. 8 and the like). The plurality of advertisement videos 62 stored in the NVM 30 are selectively read out from the NVM 30 by the CPU 28, and are used in the screen generation processing. In the example shown in FIG. 3, the plurality of advertisement videos 62 are stored in the NVM 30, but this is merely an example, and a single advertisement video 62 may be stored in the NVM 30.

The advertisement video 62 is a video showing an advertisement (for example, a moving image obtained by imaging the subject in a real space region by a camera, and/or an animation). The video showing the advertisement refers to, for example, a moving image in which the images of a plurality of frames created as an image for an advertisement are arranged in a time series. Examples of the advertisement video 62 include a video provided from a sponsor and the like who support the construction of the system (as shown in FIG. 1 as an example, the image processing system 2) for allowing the user 14 to view various videos including a virtual viewpoint video 78 (see FIG. 8).

Here, the moving image is described as an example of the advertisement video 62, but the technology of the present disclosure is not limited to this. The advertisement video 62 may be an image for the advertisement of a single-frame or an image used for a purpose other than the advertisement. The advertisement video 62 is merely an example, and a moving image or a still image of another type may be used. It should be noted that the advertisement video 62 is an example of a "specific image" according to the technology of the present disclosure.

By reading out the screen generation processing program 38 from the NVM 30 and executing the screen generation processing program 38 on the RAM 32, the CPU 28 is operated as a reception screen generation unit 28A, a viewpoint information acquisition unit 28B, a virtual viewpoint image generation unit 28C, a screen data generation unit 28D, and an output unit 28E.

Figure 4:
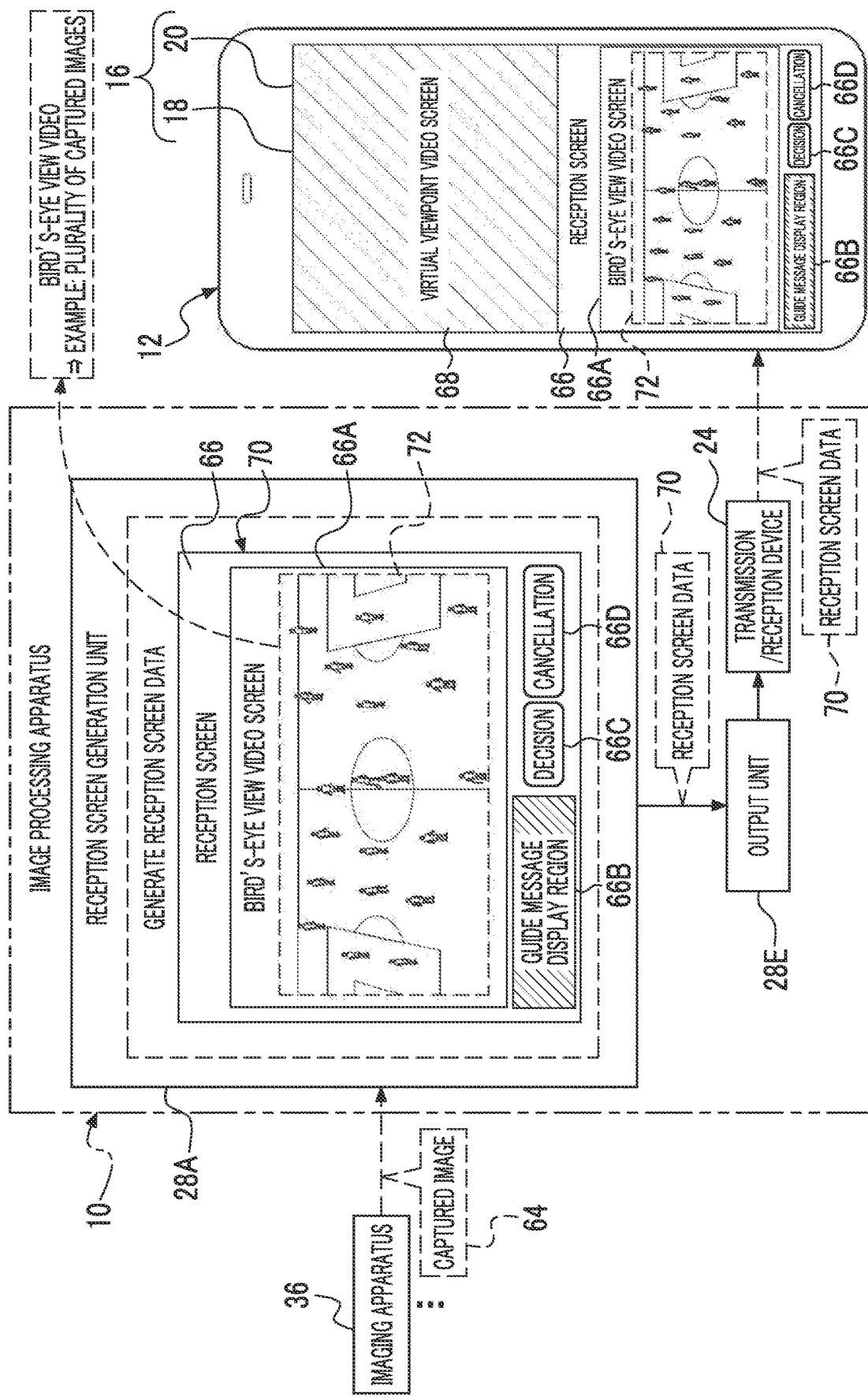
FIG. 4 is a conceptual diagram showing an example of processing contents of a reception screen generation unit and an output unit, and an example of display contents of a display of the user device.

As an example, as shown in FIG. 4, a reception screen 66 and a virtual viewpoint video screen 68 are displayed on the display 18 of the user device 12. In the example shown in FIG. 4, on the display 18, the reception screen 66 and the virtual viewpoint video screen 68 are displayed in an arranged manner. It should be noted that this is merely an example, and the reception screen 66 and the virtual viewpoint video screen 68 may be switched and displayed in response to the instruction given to the touch panel 20 by the user 14, or the reception screen 66 and the virtual viewpoint video screen 68 may be individually displayed by different display devices.

Figure 8:
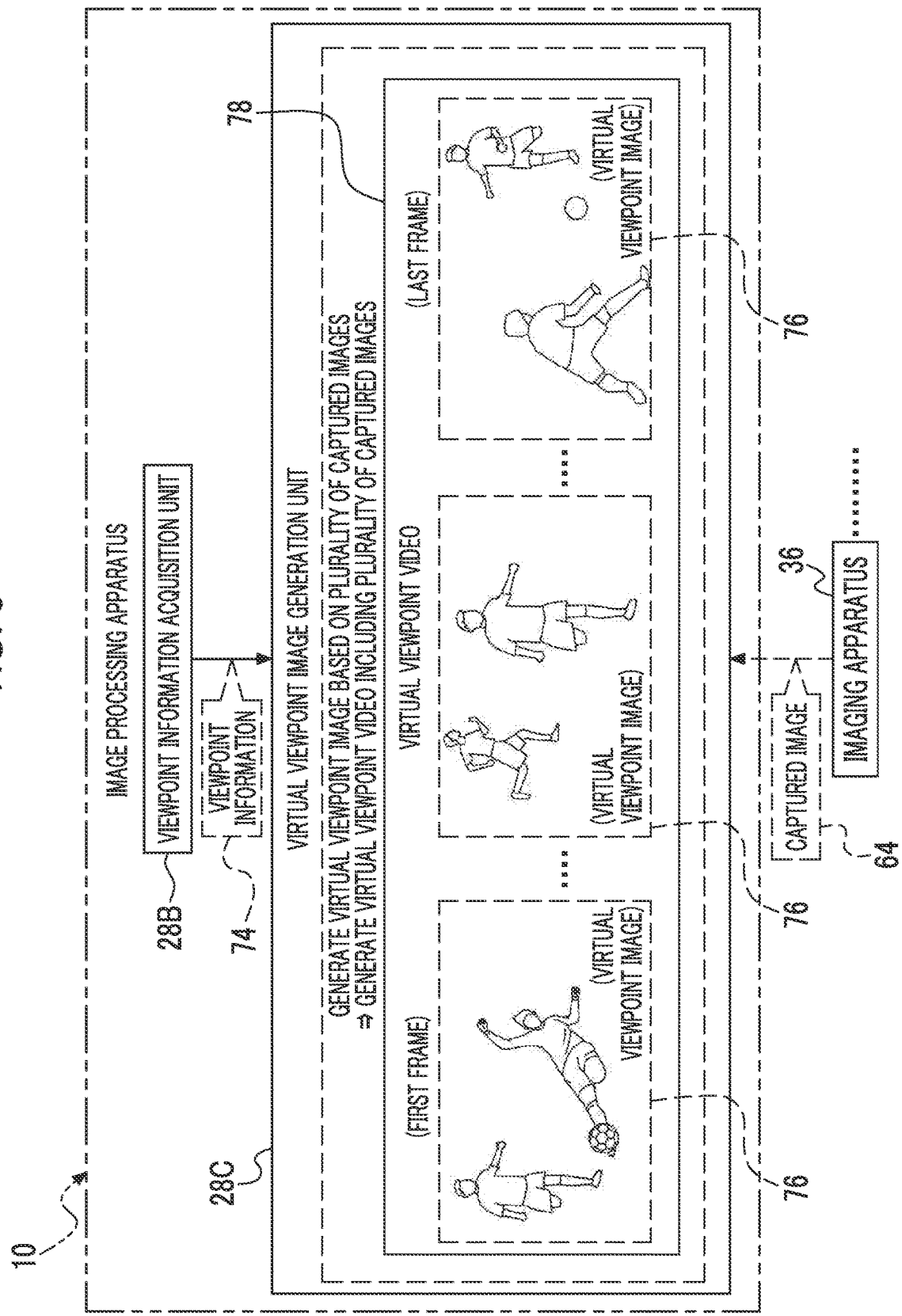
FIG. 8 is a conceptual diagram showing an example of processing contents of a virtual viewpoint image generation unit.

In addition, in the present embodiment, the reception screen 66 is displayed on the display 18 of the user device 12, but the technology of the present disclosure is not limited to this, and for example, the reception screen 66 may be displayed on a display connected to a device (for example, a personal computer) used by a person who creates or edits the virtual viewpoint video 78 (see FIG. 8).

The user device 12 acquires the virtual viewpoint video 78 (see FIG. 8) from the image processing apparatus 10 by performing communication with the image processing apparatus 10. The virtual viewpoint video 78 (see FIG. 8) acquired from the image processing apparatus 10 by the user device 12 is displayed on the virtual viewpoint video screen 68 of the display 18. In the example shown in FIG. 4, the virtual viewpoint video 78 is not displayed on the virtual viewpoint video screen 68.

The user device 12 performs communication with the image processing apparatus 10 to acquire reception screen data 70 indicating the reception screen 66 from the image processing apparatus 10. The reception screen 66 indicated by the reception screen data 70 acquired from the image processing apparatus 10 by the user device 12 is displayed on the display 18.

The reception screen 66 includes a bird's-eye view video screen 66A, a guide message display region 66B, a decision key 66C, and a cancellation key 66D, and various types of information required for generating the virtual viewpoint video 78 (see FIG. 8) is displayed on the reception screen 66. The user 14 gives an indication to the user device 12 with reference to the reception screen 66. The indication from the user 14 is received by the touch panel 20, for example.

A bird's-eye view video 72 is displayed on the bird's-eye view video screen 66A. The bird's-eye view video 72 is a moving image showing an aspect in a case in which the inside of the soccer stadium is observed from a bird's-eye view, and is generated based on the plurality of captured images 64 obtained by being captured by at least one of the plurality of imaging apparatuses 36. Examples of the bird's-eye view video 72 include a live coverage video.

Various messages indicating contents of an operation requested to the user 14 are displayed in the guide message display region 66B. The operation requested to the user 14 refers to, for example, an operation required for generating the virtual viewpoint video 78 (see FIG. 8) (for example, an operation of setting the viewpoint, an operation of setting the gaze point, and the like).

Display contents of the guide message display region 66B is switched according to an operation mode of the user device 12. For example, the user device 12 has, as the operation mode, a viewpoint setting mode in which the viewpoint is set and a gaze point setting mode in which the gaze point is set, and the display contents of the guide message display region 66B are different between the viewpoint setting mode and the gaze point setting mode.

Both the decision key 66C and the cancellation key 66D are soft keys. The decision key 66C is turned on by the user 14 in a case in which the indication received by the reception screen 66 is decided. The cancellation key 66D is turned on by the user 14 in a case in which the indication received by the reception screen 66 is cancelled.

The reception screen generation unit 28A acquires the plurality of captured images 64 from the plurality of imaging apparatuses 36, and generates the bird's-eye view video 72 based on the acquired plurality of captured images 64. Then, the reception screen generation unit 28A generates data indicating the reception screen 66 including the bird's-eye view video 72, as the reception screen data 70.

The output unit 28E acquires the reception screen data 70 generated by the reception screen generation unit 28A from the reception screen generation unit 28A to output the acquired reception screen data 70 to the transmission/reception device 24. The transmission/reception device 24 transmits the reception screen data 70 input from the output unit 28E to the user device 12. The user device 12 receives the reception screen data 70 transmitted from the transmission/reception device 24 by the transmission/reception device 44 (see FIG. 2). The reception screen 66 indicated by the reception screen data 70 received by the transmission/reception device 44 (see FIG. 2) is displayed on the display 18.

Figure 5:
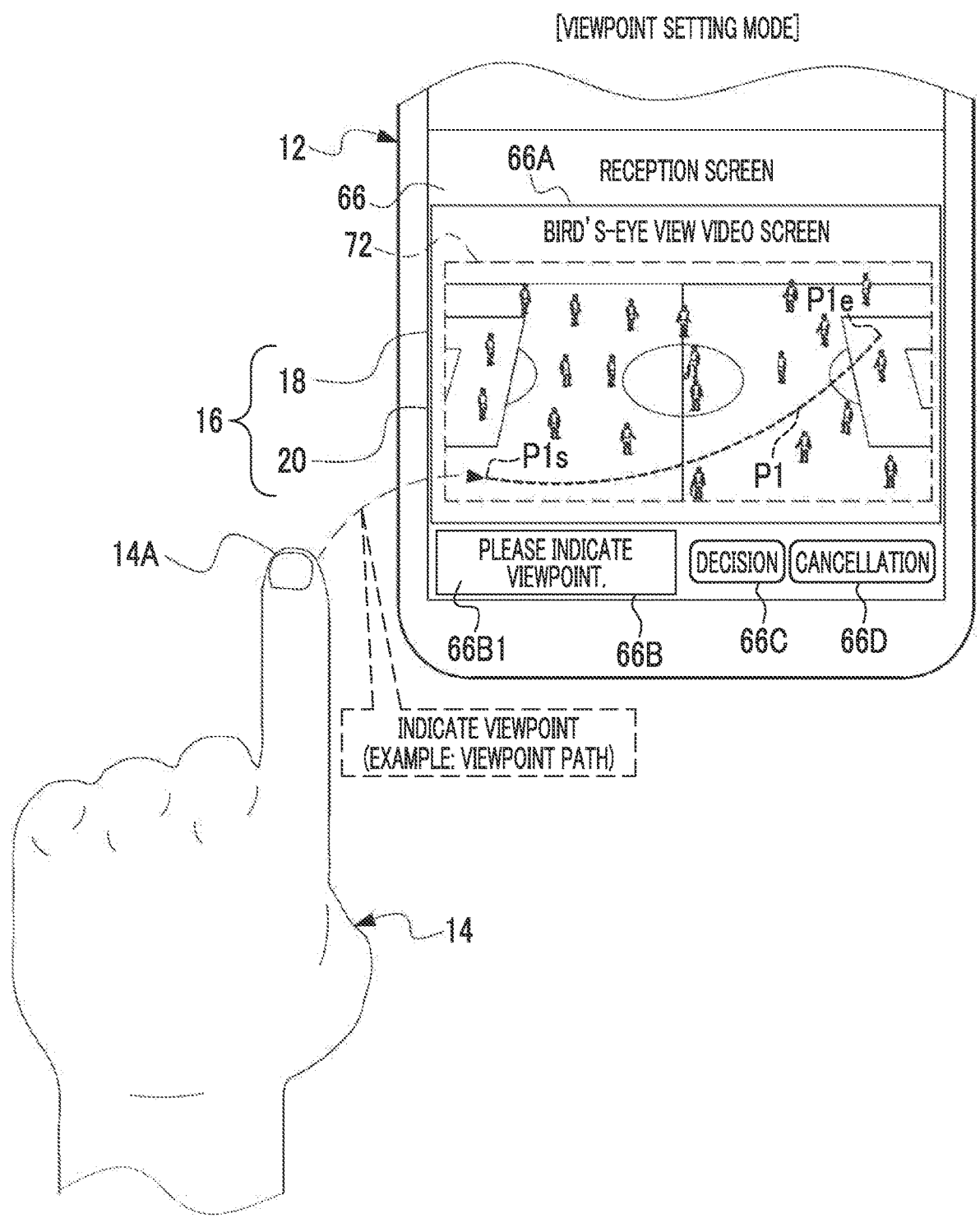
FIG. 5 is a screen view showing an example of a display aspect of a reception screen in a case in which an operation mode of the user device is a viewpoint setting mode.

As shown in FIG. 5 as an example, in a case in which the operation mode of the user device 12 is the viewpoint setting mode, a message 66B1 is displayed in the guide message display region 66B of the reception screen 66. The message 66B1 is a message prompting the user 14 to indicate the viewpoint used for the generation of the virtual viewpoint video 78 (see FIG. 8). Here, the viewpoint refers to a virtual viewpoint for observing the inside of the soccer stadium. The virtual viewpoint does not refer to a position at which an actually existing camera, such as a physical camera that images the subject (for example, the imaging apparatus 36), is installed, but refer to a position at which a virtual camera that images the subject is installed.

The touch panel 20 receives an indication from the user 14 in a state in which the message 66B1 is displayed in the guide message display region 66B. In this case, the indication from the user 14 refers to an indication of the viewpoint. The viewpoint corresponds to a position of a pixel in the bird's-eye view video 72. The indication of the viewpoint is performed by the user 14 indicating the position of the pixel in the bird's-eye view video 72 via the touch panel 20. It should be noted that the viewpoint may have three-dimensional coordinates corresponding to a three-dimensional position in the bird's-eye view video 72. Any method can be used as a method of indicating the three-dimensional position. For example, the user 14 may directly input a three-dimensional coordinate position, or may designate the three-dimensional coordinate position by displaying two images showing an aspect in a case in which the soccer stadium is seen from two planes perpendicular to each other and designating each pixel position.

In the example shown in FIG. 5, a viewpoint path P1, which is a path for observing the subject, is shown as an example of the viewpoint. The viewpoint path P1 is an aggregation in which a plurality of viewpoints are linearly arranged from a starting point P1s to an end point P1e. The viewpoint path P1 is defined along a route (in the example shown in FIG. 5, a meandering route from the starting point P1s to the end point P1e) in which the user 14 slides (that is, swipes) his/her fingertip 14A on a region corresponding to a display region of the bird's-eye view video 72 in the entire region of the touch panel 20. In addition, an observation time from the viewpoint path P1 (for example, a time of observation between two different viewpoints and/or a time of observation at a certain point in a stationary state) is defined by a speed of the slide performed with respect to the touch panel 20 in a case in which the viewpoint path P1 is formed via the touch panel 20, a time (for example, a long press time) to stay at one viewpoint on the viewpoint path P1, and the like.

In the example shown in FIG. 5, the decision key 66C is turned on in a case in which the viewpoint path P1 is settled, and the cancellation key 66D is turned on in a case in which the viewpoint path P1 is cancelled.

It should be noted that, in the example shown in FIG. 5, only the viewpoint path P1 is set, but this is merely an example, and a plurality of viewpoint paths may be set. In addition, the technology of the present disclosure is not limited to the viewpoint path, and a plurality of discontinuous viewpoints may be used, or one viewpoint may be used.

Figure 6:
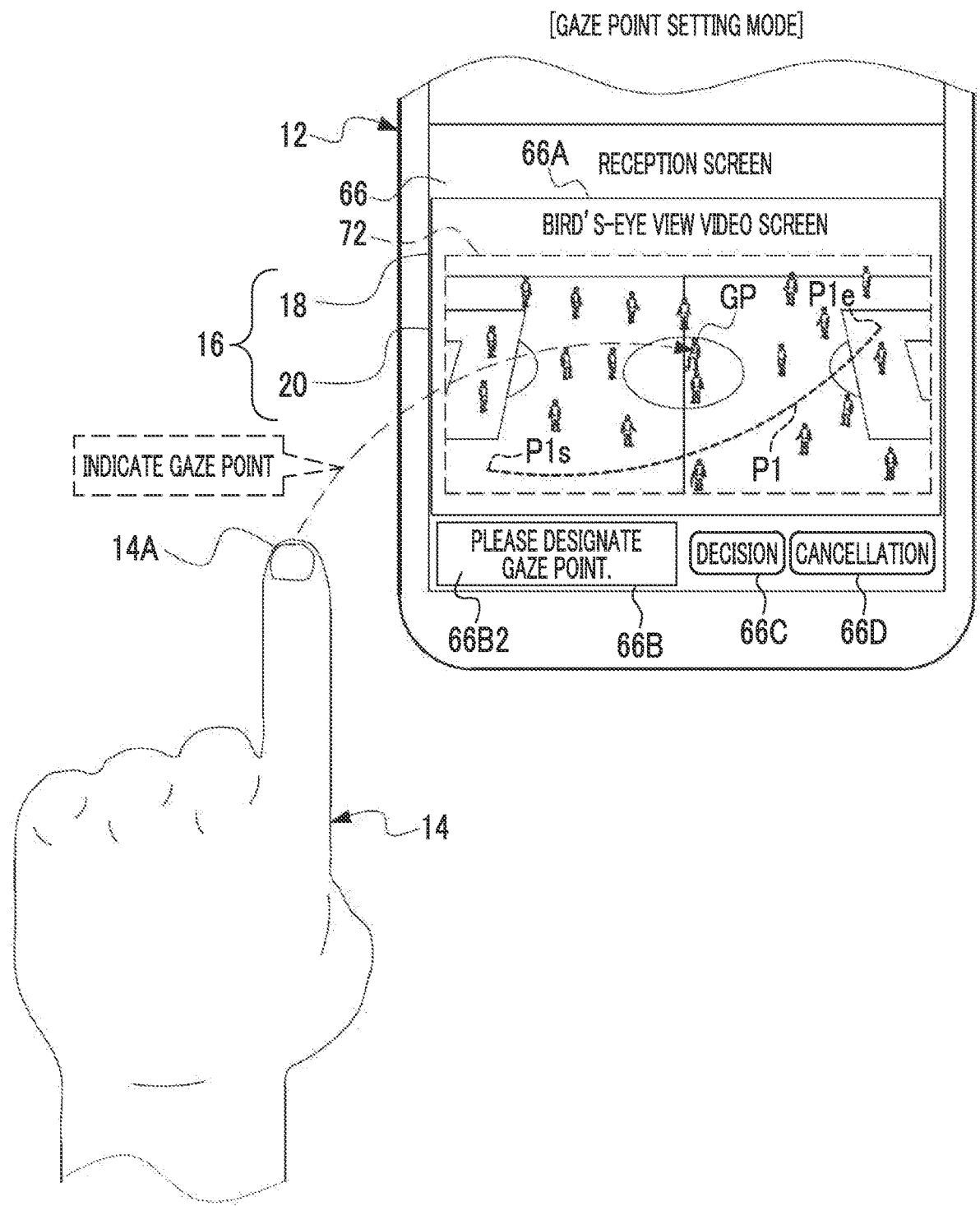
FIG. 6 is a screen view showing an example of a display aspect of the reception screen in a case in which the operation mode of the user device is a gaze point setting mode.

As shown in FIG. 6 as an example, in a case in which the operation mode of the user device 12 is the gaze point setting mode, a message 66B2 is displayed in the guide message display region 66B of the reception screen 66. The message 66B2 is a message prompting the user 14 to indicate the gaze point used for the generation of the virtual viewpoint video 78 (see FIG. 8). Here, the gaze point refers to a point that is virtually gazed in a case in which the inside of the soccer stadium is observed from the viewpoint. In a case in which the viewpoint and the gaze point are set, a virtual visual line direction (that is, an imaging direction of the virtual camera) is also uniquely decided. The virtual visual line direction refers to a direction from the viewpoint to the gaze point.

The touch panel 20 receives an indication from the user 14 in a state in which the message 66B2 is displayed in the guide message display region 66B. In this case, the indication from the user 14 refers to an indication of the gaze point. The gaze point corresponds to a position of a pixel in the bird's-eye view video 72. The indication of the gaze point is performed by the user 14 indicating the position of the pixel in the bird's-eye view video 72 via the touch panel 20. In the example shown in FIG. 6, a gaze point GP is shown. The gaze point GP is defined according to a location in which the user 14 touches his/her fingertip 14A on the region corresponding to the display region of the bird's-eye view video 72 in the entire region of the touch panel 20. In the example shown in FIG. 6, the decision key 66C is turned on in a case in which the gaze point GP is settled, and the cancellation key 66D is turned on in a case in which the gaze point GP is cancelled. It should be noted that the gaze point may have three-dimensional coordinates corresponding to a three-dimensional position in the bird's-eye view video 72. Any method can be used as a method of indicating the three-dimensional position, as in the indication of the viewpoint position.

It should be noted that, in the example shown in FIG. 6, only the gaze point GP is designated, but this is merely an example, and a plurality of gaze points may be used, or a path (that is, a gaze point path) in which a plurality of gaze points are linearly arranged may be used. One or a plurality of gaze point paths may be used.

Figure 7:
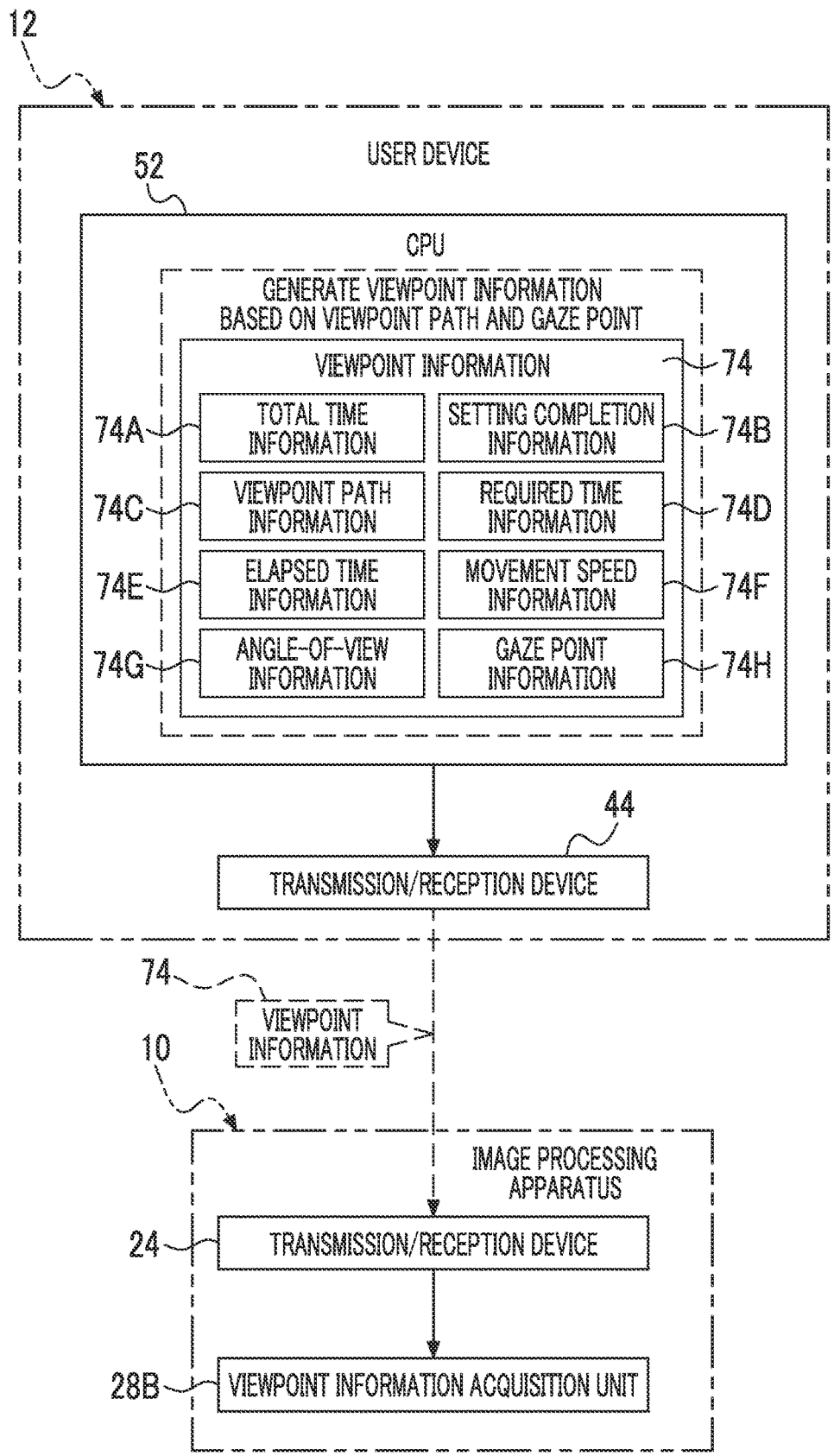
FIG. 7 is a block diagram showing an example of contents of viewpoint information and an example of an aspect in which the viewpoint information is transmitted from the user device to the image processing apparatus.

As an example, as shown in FIG. 7, the CPU 52 of the user device 12 generates viewpoint information 74 based on the viewpoint path P1 and the gaze point GP. The viewpoint information 74 is information used for the generation of the virtual viewpoint video 78 (see FIG. 8). The viewpoint information 74 includes total time information 74A, setting completion information 74B, viewpoint path information 74C, required time information 74D, elapsed time information 74E, movement speed information 74F, angle-of-view information 74G, and gaze point information 74H.

The total time information 74A is information indicating a total time (hereinafter, also simply referred to as a "total time") in which the virtual viewpoint video 78 (see FIG. 8) generated based on one or more viewpoint paths (for example, the plurality of viewpoint paths including the viewpoint path P1) settled in the viewpoint setting mode is played back at a standard playback speed. The total time corresponds to a time in which the fingertip 14A is slid on the touch panel 20 to create the plurality of viewpoint paths. It should be noted that the total time information 74A is an example of a "time parameter related to a time" according to the technology of the present disclosure.

The setting completion information 74B is information indicating that setting of the viewpoint information 74 is completed. The completion of the setting of the viewpoint information 74 means, for example, completion of generation of the viewpoint information 74 by the CPU 52.

The viewpoint path information 74C is information indicating the viewpoint path P1 settled in the viewpoint setting mode (for example, coordinates for specifying a position of a pixel of the viewpoint path P1 in the bird's-eye view video 72).

The required time information 74D is information indicating a required time (hereinafter, also simply referred to as a "required time"), which is required for a first viewpoint for observing the subject on the viewpoint path P1 to move from a first position to a second position different from the first position. Here, the first position refers to the starting point P1s (see FIG. 5 and FIG. 6), and the second position refers to, for example, the end point P1e (see FIG. 5 and FIG. 6). It should be noted that this is merely an example, and the first position may be the starting point P1s (see FIG. 5 and FIG. 6) and the second position may be a position of the intermediate viewpoint on the viewpoint path P1, or the first position may be a position of the intermediate viewpoint in the viewpoint path P1 and the second position may be the end point P1e (see FIG. 5 and FIG. 6).

The elapsed time information 74E is information indicating a position of the second viewpoint for observing the subject on the viewpoint path P1 and the elapsed time corresponding to the position of the second viewpoint. The elapsed time corresponding to the position of the second viewpoint (hereinafter, also simply referred to as an "elapsed time") refers to, for example, a time in which the viewpoint is stationary at a position of a certain viewpoint on the viewpoint path P1.

The movement speed information 74F is information for specifying a movement speed of a position of a third viewpoint for observing the subject on the viewpoint path P1. The movement speed of the position of the third viewpoint (hereinafter, also simply referred to as a "movement speed") refers to, for example, the speed of the slide performed on the touch panel 20 in a case in which the viewpoint path P1 is formed via the touch panel 20. The movement speed information 74F is associated with each viewpoint in the viewpoint path P1.

The angle-of-view information 74G is information related to an angle of view (hereinafter, also simply referred to as an "angle of view") for observing the subject on the viewpoint path P1. In the present embodiment, the angle of view is decided according to the movement speed. For example, within a range in which an upper limit (for example, 150 degrees) and a lower limit (for example, 15 degrees) of the angle of view are decided, the angle of view is narrower as the movement speed is lower.

It should be noted that this is merely an example, and for example, the angle of view may be narrower as the movement speed is higher. In addition, the angle of view may be decided according to the elapsed time. In this case, for example, the angle of view need only be minimized in a case in which the elapsed time exceeds a first predetermined time (for example, 3 seconds), or the angle of view need only be maximized in a case in which the elapsed time exceeds the first predetermined time.

In addition, the angle of view may be decided according to, for example, the indication received by the reception device 50. In this case, the reception device 50 need only receive the indications regarding the position of the viewpoint of which the angle of view is changed and the changed angle of view on the viewpoint path P1.

The gaze point information 74H is information for specifying a position of the gaze point GP settled in the gaze point setting mode (for example, coordinates for specifying a position of a pixel of the gaze point GP in the bird's-eye view video 72). It should be noted that the gaze point information 74H is an example of "gaze point information" according to the technology of the present disclosure.

The CPU 52 outputs the viewpoint information 74 to the transmission/reception device 44. The transmission/reception device 44 transmits the viewpoint information 74 input from the CPU 52 to the image processing apparatus 10. The transmission/reception device 24 of the image processing apparatus 10 receives the viewpoint information 74. The viewpoint information acquisition unit 28B of the image processing apparatus 10 acquires the viewpoint information 74 received by the transmission/reception device 24.

As shown in FIG. 8 as an example, the virtual viewpoint image generation unit 28C generates the virtual viewpoint image 76, which is an image showing an aspect of the subject in a case in which the subject is observed from the viewpoint specified by the viewpoint information 74, based on the plurality of captured images 64 and the viewpoint information 74. For example, the virtual viewpoint image generation unit 28C acquires the plurality of captured images 64 from the plurality of imaging apparatuses 36 according to the viewpoint information 74, and generates the virtual viewpoint image 76 for each viewpoint on the viewpoint path P1 based on the acquired plurality of captured images 64. That is, the virtual viewpoint image generation unit 28C generates the virtual viewpoint images 76 of a plurality of frames according to the viewpoint path P1. The virtual viewpoint images 76 of the plurality of frames generated according to the viewpoint path P1 refers to the virtual viewpoint image 76 generated for each viewpoint on the viewpoint path P1. The virtual viewpoint image generation unit 28C generates the virtual viewpoint video 78 by arranging the virtual viewpoint images 76 of the plurality of frames in a time series. It should be noted that, even in a case in which the viewpoint path is present in addition to the viewpoint path P1, the virtual viewpoint image generation unit 28C generates the virtual viewpoint images 76 of the plurality of frames as in the viewpoint path P1, and generates the virtual viewpoint video 78 by arranging the generated virtual viewpoint images 76 of the plurality of frames in a time series.

The virtual viewpoint video 78 is a moving image in which the virtual viewpoint images 76 of the plurality of frames are arranged in a time series. A person who views the virtual viewpoint video 78 is the user 14, for example. The virtual viewpoint video 78 is viewed by the user 14 via the display 18 of the user device 12. For example, the virtual viewpoint images 76 of the plurality of frames are viewed by the user 14 as the virtual viewpoint video 78 by being displayed on the virtual viewpoint video screen 68 (see FIG. 4) of the display 18 of the user device 12 at a predetermined frame rate (for example, several tens of frames/second) from the first frame to the last frame.

Figure 9:
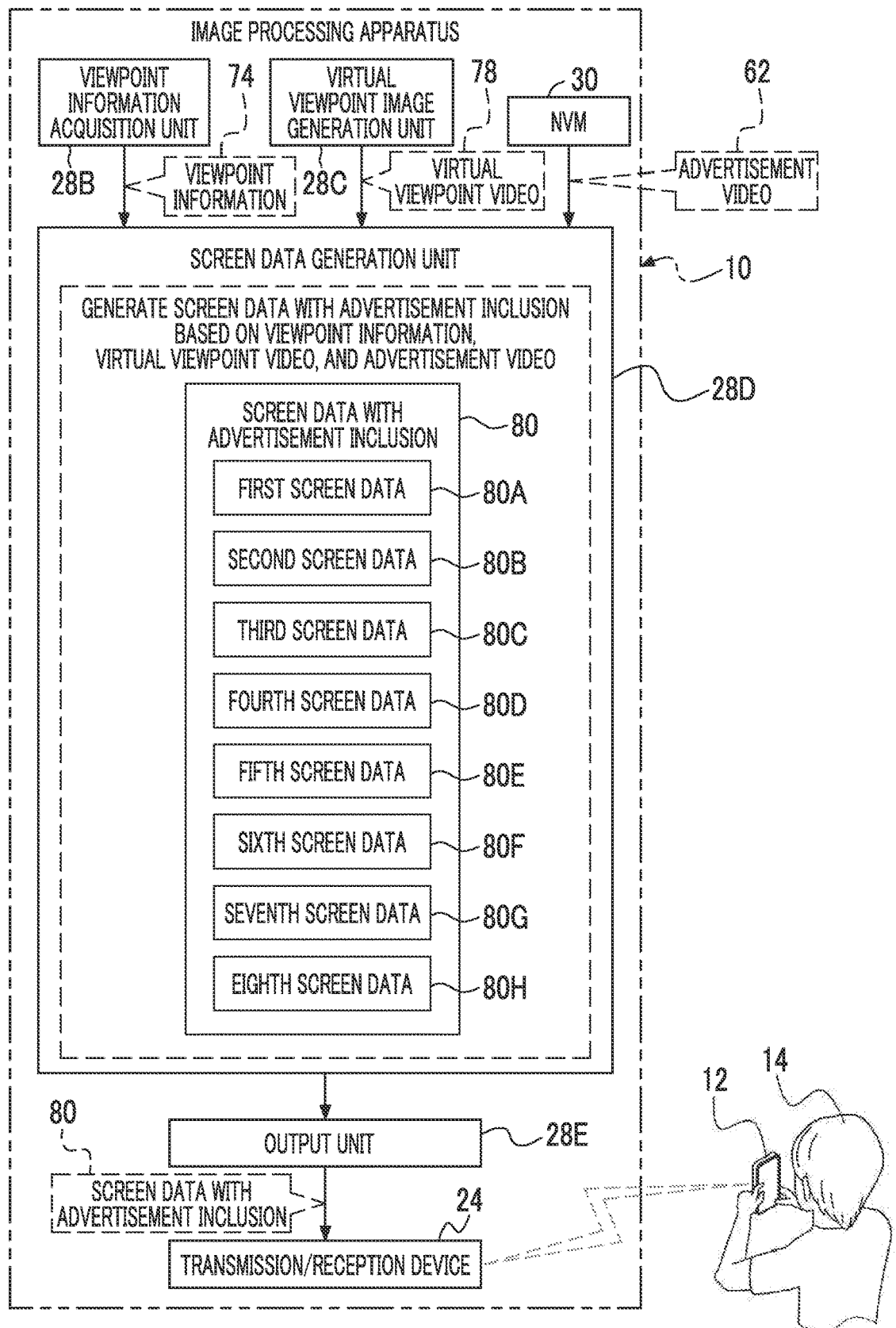
FIG. 9 is a conceptual diagram showing an example of processing contents of a screen data generation unit and the output unit.

As shown in FIG. 9 as an example, the screen data generation unit 28D generates screen data with advertisement inclusion 80 based on the viewpoint information 74 (for example, the viewpoint information 74 used for the generation of the virtual viewpoint video 78) acquired by the viewpoint information acquisition unit 28B, the virtual viewpoint video 78 generated by the virtual viewpoint image generation unit 28C, and at least one advertisement video 62 stored in the NVM 30. The screen data with advertisement inclusion 80 is data for displaying the advertisement video 62 and the virtual viewpoint video 78 on the display 18 (see FIG. 10) of the user device 12 based on the viewpoint information 74. In addition, the screen data with advertisement inclusion 80 is also data for displaying the advertisement video 62 on the display 18 (see FIG. 10) at a timing which is decided according to the viewpoint information 74. It should be noted that the screen data with advertisement inclusion 80 does not have to be one data including the advertisement video 62 and the virtual viewpoint video 78, and may be any data as long as the data is for displaying the advertisement video 62 and the virtual viewpoint video 78 on the display 18 of the user device 12 at a timing described below. For example, the screen data with advertisement inclusion 80 may be data only for deciding display timings of the advertisement video 62 and the virtual viewpoint video 78. In this case, the advertisement video 62 and the virtual viewpoint video 78 are streamed and distributed at the decided timings, and displayed on the display 18.

The screen data with advertisement inclusion 80 includes first screen data 80A, second screen data 80B, third screen data 80C, fourth screen data 80D, fifth screen data 80E, sixth screen data 80F, seventh screen data 80G, and eighth screen data 80H.

Here, the form example is described in which the screen data with advertisement inclusion 80 includes the first screen data 80A, the second screen data 80B, the third screen data 80C, the fourth screen data 80D, the fifth screen data 80E, the sixth screen data 80F, the seventh screen data 80G, and the eighth screen data 80H. However, this is merely an example, and the screen data with advertisement inclusion 80 need only include one or more screen data of the first screen data 80A, the second screen data 80B, the third screen data 80C, the fourth screen data 80D, the fifth screen data 80E, the sixth screen data 80F, the seventh screen data 80G, and the eighth screen data 80H.

It should be noted that the screen data with advertisement inclusion 80 is an example of "data" according to the technology of the present disclosure. In addition, the first screen data 80A is an example of "first data" according to the technology of the present disclosure. In addition, the second screen data 80B is an example of "second data" according to the technology of the present disclosure. In addition, the third screen data 80C is an example of "third data" according to the technology of the present disclosure. In addition, the fourth screen data 80D is an example of "fourth data" according to the technology of the present disclosure. In addition, the fifth screen data 80E is an example of "fifth data" according to the technology of the present disclosure. In addition, the sixth screen data 80F is an example of "sixth data" according to the technology of the present disclosure. In addition, the seventh screen data 80G is an example of "seventh data" according to the technology of the present disclosure. Further, the eighth screen data 80H is an example of "eighth data" according to the technology of the present disclosure.

The output unit 28E outputs the screen data with advertisement inclusion 80 generated by the screen data generation unit 28D to the transmission/reception device 24. The transmission/reception device 24 transmits the screen data with advertisement inclusion 80 input from the output unit 28E to the user device 12.

Figure 10:
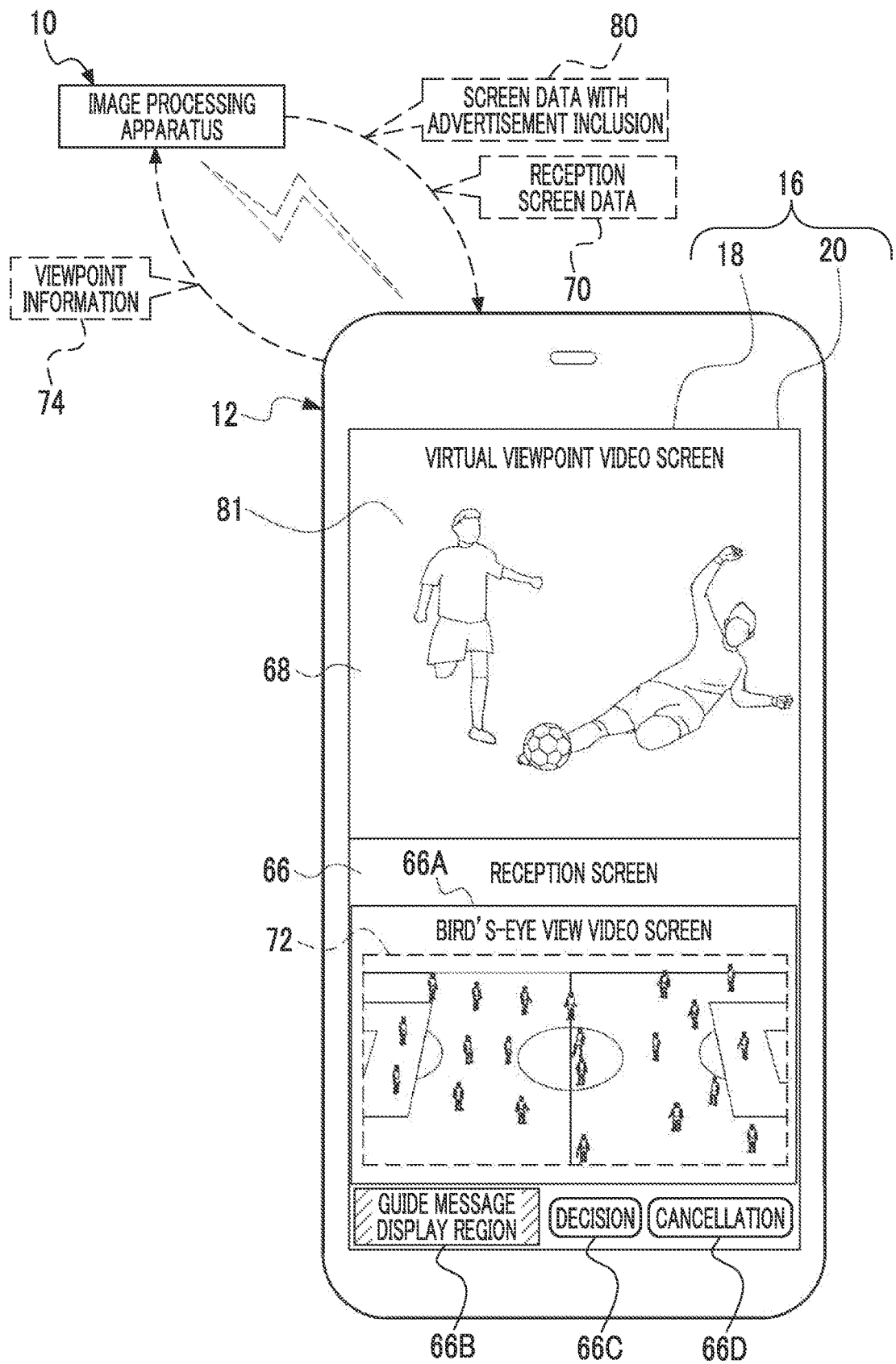
FIG. 10 is a screen view showing an example of an aspect in which a virtual viewpoint video with advertisement inclusion and the reception screen are displayed on the display of the user device.

As an example, as shown in FIG. 10, various types of information are exchanged between the image processing apparatus 10 and the user device 12. For example, the user device 12 transmits the viewpoint information 74 to the image processing apparatus 10. The image processing apparatus 10 transmits the reception screen data 70 to the user device 12. In addition, the image processing apparatus 10 receives the viewpoint information 74 transmitted from the user device 12, and generates the screen data with advertisement inclusion 80 based on the received viewpoint information 74. Then, the image processing apparatus 10 transmits the screen data with advertisement inclusion 80 to the user device 12.

The user device 12 receives the reception screen data 70 and the screen data with advertisement inclusion 80 which are transmitted from the image processing apparatus 10. The user device 12 displays the reception screen 66 indicated by the reception screen data 70 on the display 18, and displays an image based on the screen data with advertisement inclusion 80 on the virtual viewpoint video screen 68. Here, the image based on the screen data with advertisement inclusion 80 refers to a virtual viewpoint video with advertisement inclusion 81. The virtual viewpoint video with advertisement inclusion 81 refers to a video including the advertisement video 62 and the virtual viewpoint video 78. In the present embodiment, the virtual viewpoint video with advertisement inclusion 81 is classified into virtual viewpoint videos with advertisement inclusion 81A to 81H (see FIG. 11, FIG. 12, and FIG. 14 to FIG. 19).

Figure 11:
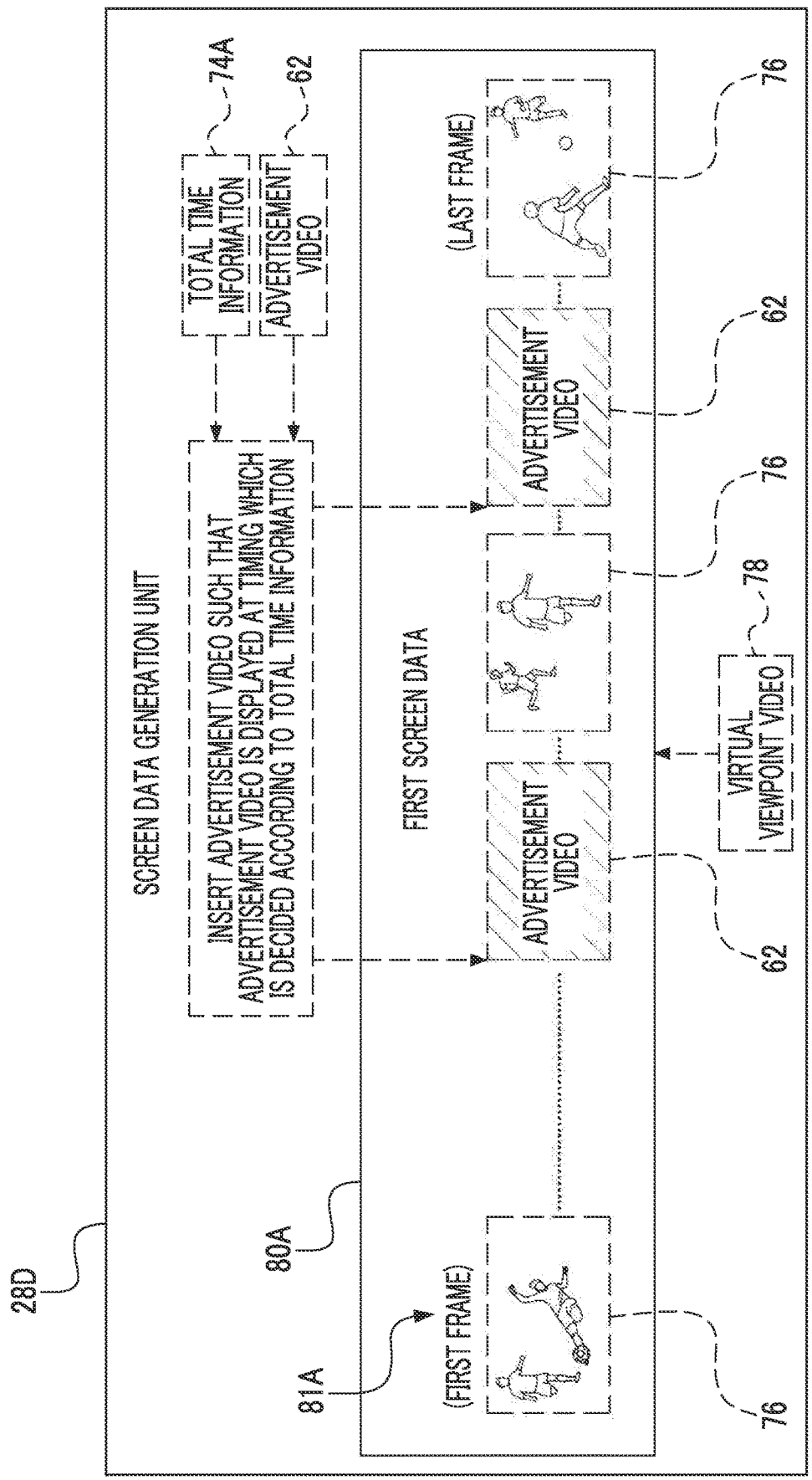
FIG. 11 is a conceptual diagram showing an example of contents of first screen data generated by the screen data generation unit.

As shown in FIG. 11 as an example, the screen data generation unit 28D generates the first screen data 80A including the virtual viewpoint video with advertisement inclusion 81A based on the total time information 74A, the advertisement video 62, and the virtual viewpoint video 78. The first screen data 80A is data for displaying the virtual viewpoint video 78 on the display 18. In addition, the first screen data 80A is also data for displaying the advertisement video 62 on the display 18 according to the total time information 74A.

The screen data generation unit 28D generates the virtual viewpoint video with advertisement inclusion 81A by inserting the advertisement video 62 in the virtual viewpoint video 78 such that the advertisement video 62 is displayed on the display 18 at a timing which is decided according to the total time information 74A.

A first example of the timing which is decided according to the total time information 74A is a time interval obtained by equally dividing the total time indicated by the total time information 74A. In addition, a second example of the timing which is decided according to the total time information 74A is a timing before the virtual viewpoint image 76 of the first frame included in the virtual viewpoint video 78 is displayed in a case in which the total time indicated by the total time information 74A is shorter than a second predetermined time (for example, 20 seconds). In addition, a third example of the timing which is decided according to the total time information 74A is a timing in the middle of displaying of the virtual viewpoint video 78 in a case in which the total time indicated by the total time information 74A is equal to or longer than the second predetermined time. Another example of the timing which is decided according to the total time information 74A is a timing after the virtual viewpoint image 76 of the last frame is displayed.

Figure 12:
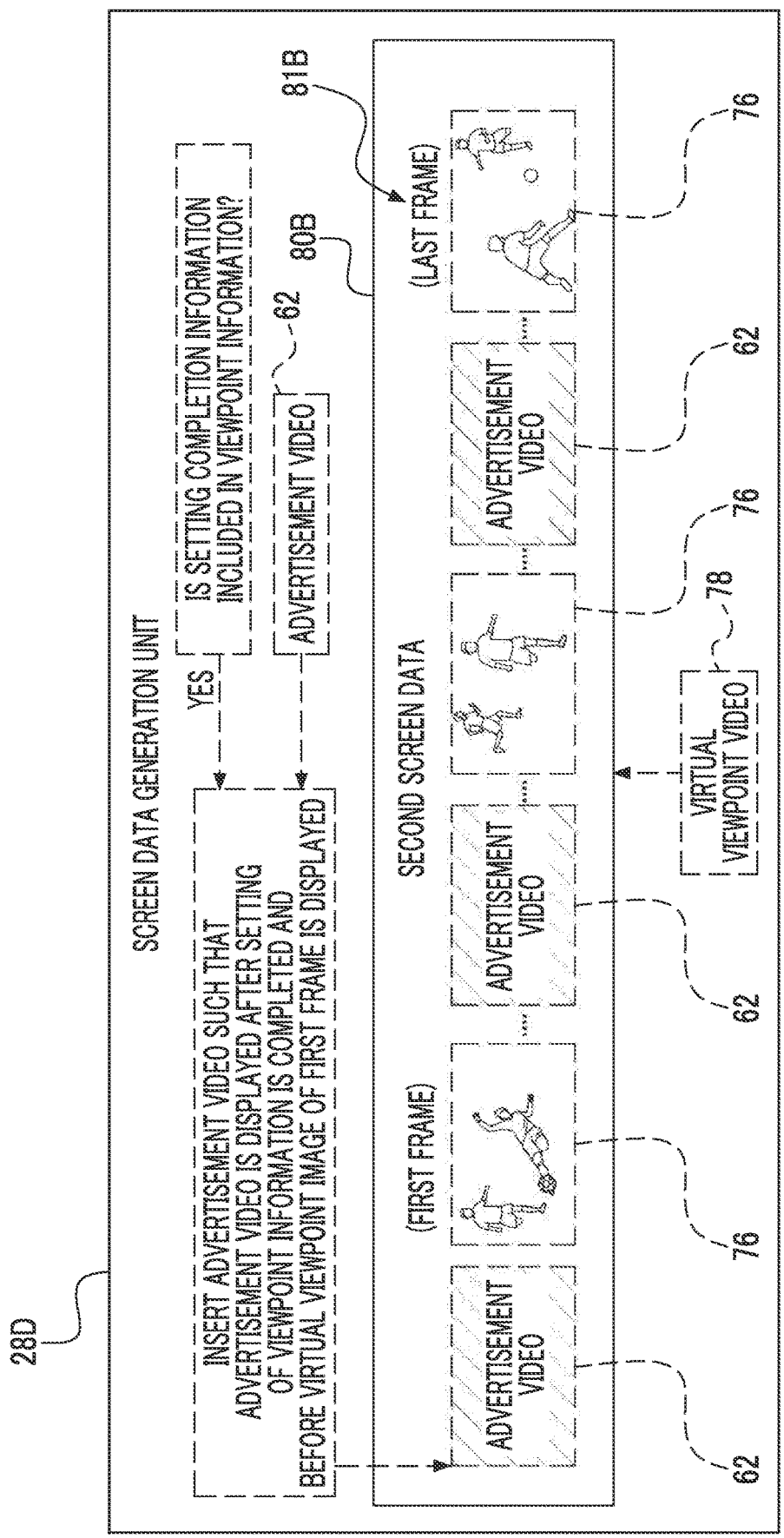
FIG. 12 is a conceptual diagram showing an example of contents of second screen data generated by the screen data generation unit.

As shown in FIG. 12 as an example, the screen data generation unit 28D generates the second screen data 80B including the virtual viewpoint video with advertisement inclusion 81B based on the setting completion information 74B, the advertisement video 62, and the virtual viewpoint video 78. The second screen data 80B is data for displaying the virtual viewpoint video 78 on the display 18. In addition, the second screen data 80B is data for displaying the advertisement video 62 on the display 18 during a period from the completion of the setting of the viewpoint information 74 to displaying of the virtual viewpoint video 78 on the display 18 according to the setting completion information 74B.

The screen data generation unit 28D determines whether or not the setting completion information 74B is included in the viewpoint information 74. Then, in a case in which the screen data generation unit 28D determines that the setting completion information 74B is included in the viewpoint information 74, the screen data generation unit 28D generates the virtual viewpoint video with advertisement inclusion 81B by inserting the advertisement video 62 in the virtual viewpoint video 78 such that the advertisement video 62 is displayed on the display 18 after the setting of the viewpoint information 74 is completed and before the virtual viewpoint image 76 of the first frame included in the virtual viewpoint video 78 is displayed on the display 18.

It should be noted that, in the example shown in FIG. 12, the advertisement video 62 is also inserted between the virtual viewpoint image 76 of the first frame of the virtual viewpoint video 78 and the virtual viewpoint image 76 of the last frame. A method of inserting the advertisement video 62 between the virtual viewpoint image 76 of the first frame and the virtual viewpoint image 76 of the last frame may be, for example, the same method as a method used for the generation of the virtual viewpoint video with advertisement inclusion 81A shown in FIG. 11. Also, the advertisement video 62 may be inserted in the middle of the virtual viewpoint video 78 by another method (for example, the same method as a method used for the generation of the virtual viewpoint videos with advertisement inclusion 81C to 81H described below).

Figure 13:
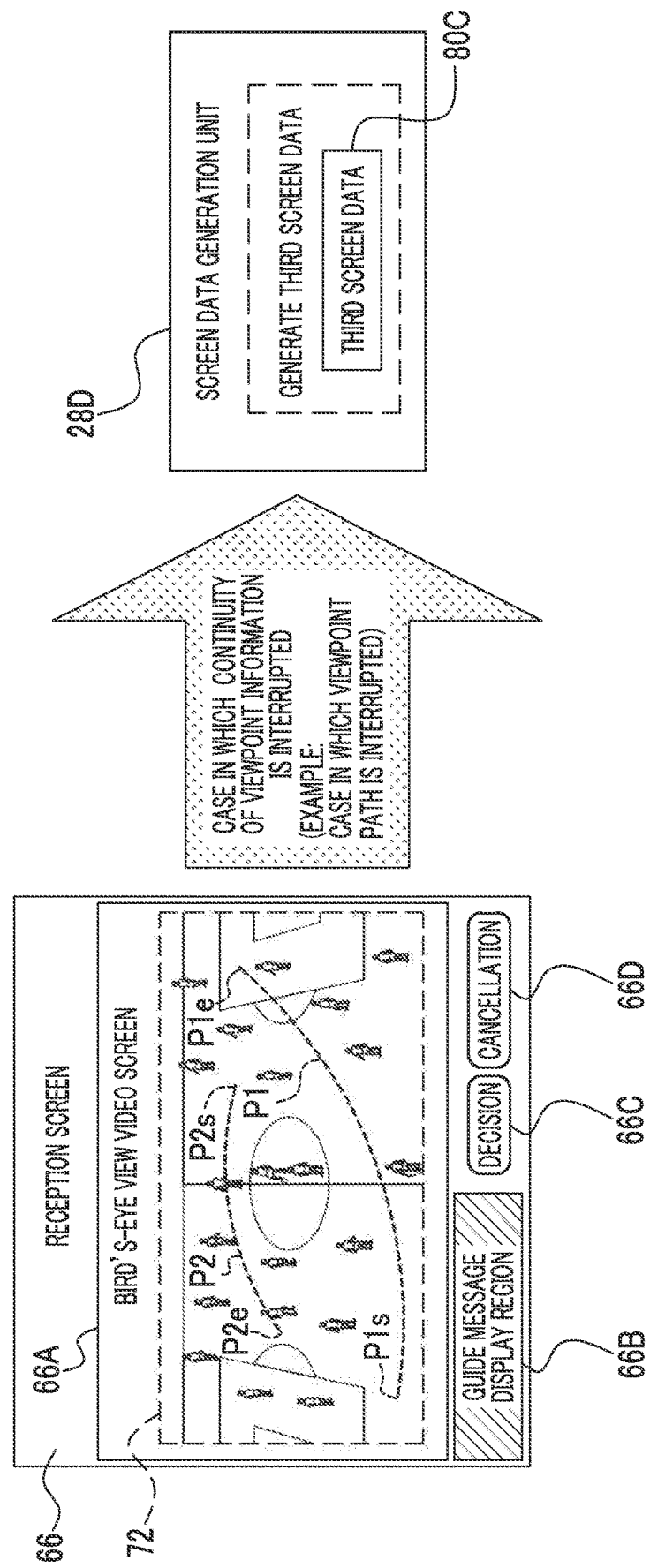
FIG. 13 is a conceptual diagram showing an example of an aspect in which third screen data is generated by the screen data generation unit in a case in which continuity of the viewpoint information is interrupted.

As an example, as shown in FIG. 13, in a case in which the plurality of viewpoint paths including the viewpoint path P1 are designated via the reception screen 66 and virtual viewpoint videos generated based on the plurality of viewpoint paths are continuously played back, the continuity of the viewpoint information 74 may be interrupted between the end point of a certain viewpoint path and the starting point of the next viewpoint path. In the example shown in FIG. 13, in addition to the viewpoint path P1, a viewpoint path P2 from a starting point P2s to an end point P2e is designated by the user 14, the virtual viewpoint video based on the viewpoint path P1 is played back, and subsequently, the virtual viewpoint video based on the viewpoint path P2 is played back. Here, the end point P1e of the viewpoint path P1 and the starting point P2s of the viewpoint path P2 are discontinuous. That is, the continuity of the viewpoint information 74 is interrupted between the end point P1e of the viewpoint path P1 and the starting point P2s of the viewpoint path P2. Therefore, in a case in which the viewpoint moves from the end point P1e to the starting point P2s, the virtual viewpoint video is significantly changed. In this case, the screen data generation unit 28D generates the third screen data 80C.

Figure 14:
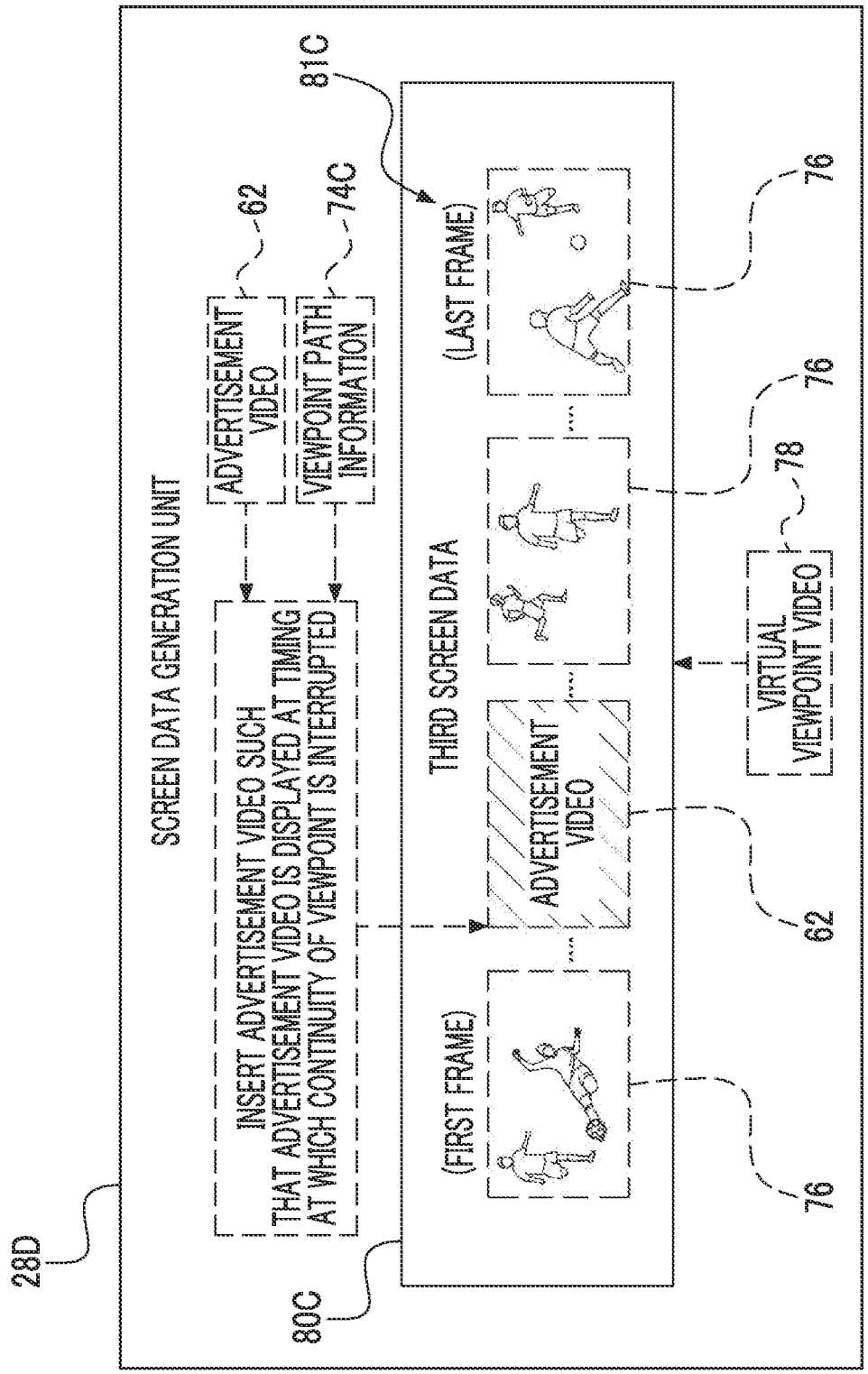
FIG. 14 is a conceptual diagram showing an example of contents of the third screen data generated by the screen data generation unit.

As shown in FIG. 14 as an example, the screen data generation unit 28D generates the third screen data 80C including the virtual viewpoint video with advertisement inclusion 81C based on the advertisement video 62, the viewpoint path information 74C, and the virtual viewpoint video 78. The third screen data 80C is data for displaying the virtual viewpoint video 78 on the display 18. In addition, the third screen data 80C is also data for displaying the advertisement video 62 on the display 18 according to a timing at which the continuity of the viewpoint information 74 is interrupted.

The screen data generation unit 28D generates the virtual viewpoint video with advertisement inclusion 81C by inserting the advertisement video 62 in the virtual viewpoint video 78 such that the advertisement video 62 is displayed on the display 18 at the timing at which the continuity of the viewpoint is interrupted, with reference to the viewpoint path information 74C. Here, the timing at which the continuity of the viewpoint is interrupted refers to, for example, a timing from after the viewpoint corresponding to the virtual viewpoint image 76 reaches the end point Ple (see FIG. 14) of the viewpoint path P1 and to before the viewpoint reaches the starting point P2*s* (see FIG. 14) of the viewpoint path P2. In other words, in this example, since the viewpoint path is divided into two parts by the instruction of the user 14, the screen data generation unit 28D determines that the continuity of the viewpoint is interrupted. It should be noted that the timing at which the continuity of the viewpoint is interrupted is not limited to such a timing. For example, at a timing at which a distance between two viewpoints, which are temporally continuous, exceeds a predetermined threshold value or at a timing at which contents of the virtual viewpoint video decided by the position of the viewpoint and the position of the gaze point is significantly changed, the screen data generation unit 28D may determine that the continuity of the viewpoint is interrupted.

Figure 15:
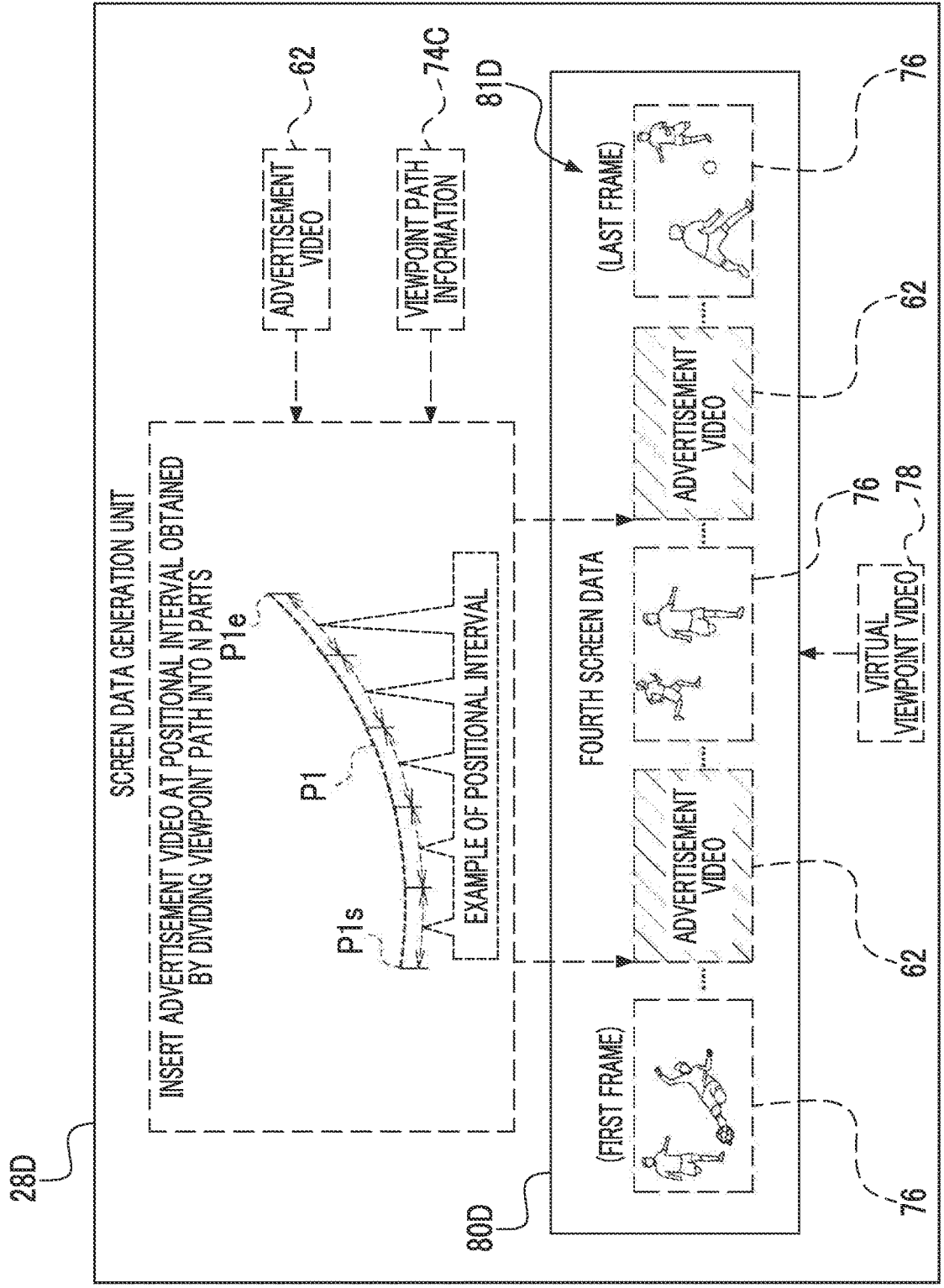
FIG. 15 is a conceptual diagram showing an example of contents of fourth screen data generated by the screen data generation unit.

As shown in FIG. 15 as an example, the screen data generation unit 28D generates the fourth screen data 80D including the virtual viewpoint video with advertisement inclusion 81D based on the advertisement video 62, the viewpoint path information 74C, and the virtual viewpoint video 78. The fourth screen data 80D is data for displaying the virtual viewpoint video 78 on the display 18. In addition, the fourth screen data 80D is also data for displaying the advertisement video 62 on the display 18 at an interval at which the viewpoint path P1 indicated by the viewpoint path information 74C is divided.

The screen data generation unit 28D generates the virtual viewpoint video with advertisement inclusion 81D by inserting the advertisement video 62 in the virtual viewpoint video 78 such that the advertisement video 62 is displayed on the display 18 at a positional interval at which the viewpoint path P1 indicated by the viewpoint path information 74C is divided into N (natural number of 2 or more) parts. The number of division parts of the viewpoint path P1 may be decided according to the instruction received by the reception device 50 (see FIG. 2), or may be decided according to a length from the starting point P1*s* to the end point Ple of the viewpoint path P1.

In addition, the viewpoint path P1 does not always have to be equally divided into N parts. For example, the advertisement video 62 may be displayed on the display 18 at a positional interval obtained by dividing the viewpoint path P1 into N parts such that an insertion interval of the advertisement video 62 is shortened as the viewpoint corresponding to the virtual viewpoint image 76 approaches the end point Ple of the viewpoint path P1, that is, as the virtual viewpoint video 78 approaches the virtual viewpoint image 76 of the last frame.

Figure 16:
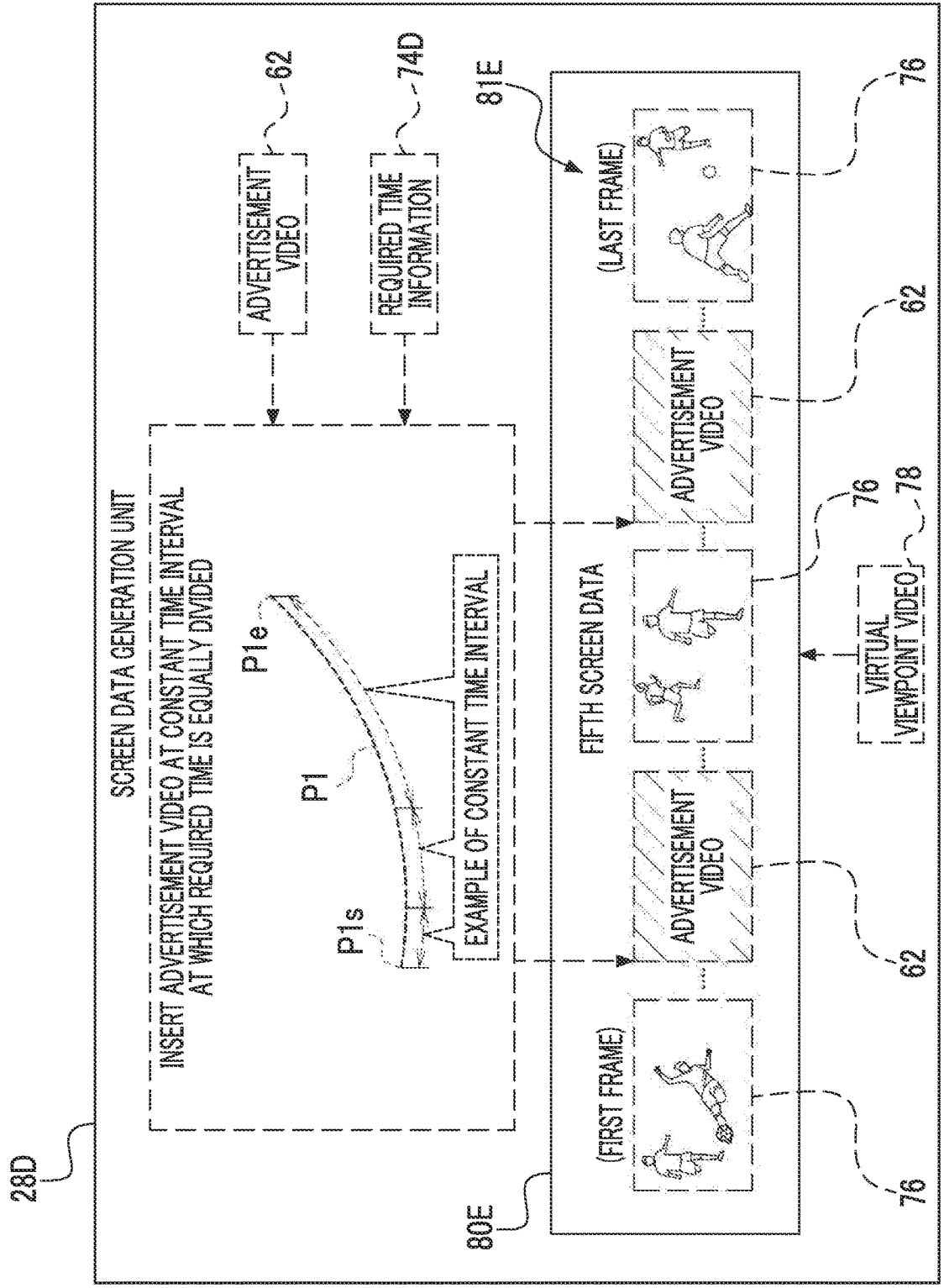
FIG. 16 is a conceptual diagram showing an example of contents of fifth screen data generated by the screen data generation unit.

As shown in FIG. 16 as an example, the screen data generation unit 28D generates the fifth screen data 80E including the virtual viewpoint video with advertisement inclusion 81E based on the advertisement video 62, the required time information 74D, and the virtual viewpoint video 78. The fifth screen data 80E is data for displaying the virtual viewpoint video 78 on the display 18. In addition, the fifth screen data 80E is also data for displaying the advertisement video 62 on the display 18 at an interval at which the required time indicated by the required time information 74D is divided.

The screen data generation unit 28D generates the virtual viewpoint video with advertisement inclusion 81E by inserting the advertisement video 62 in the virtual viewpoint video 78 such that the advertisement video 62 is displayed on the display 18 at a constant time interval at which the required time indicated by the required time information 74D is equally divided. The number of equal divisions of the required time may be decided according to the instruction received by the reception device 50 (see FIG. 2), or may be decided according to a length of the required time indicated by the required time information 74D. In addition, the equal division is merely an example, and for example, the insertion interval of the advertisement video 62 may be shortened as the viewpoint corresponding to the virtual viewpoint image 76 approaches the end point Ple of the viewpoint path P1, that is, as the virtual viewpoint video 78 approaches the virtual viewpoint image 76 of the last frame.

Figure 17:
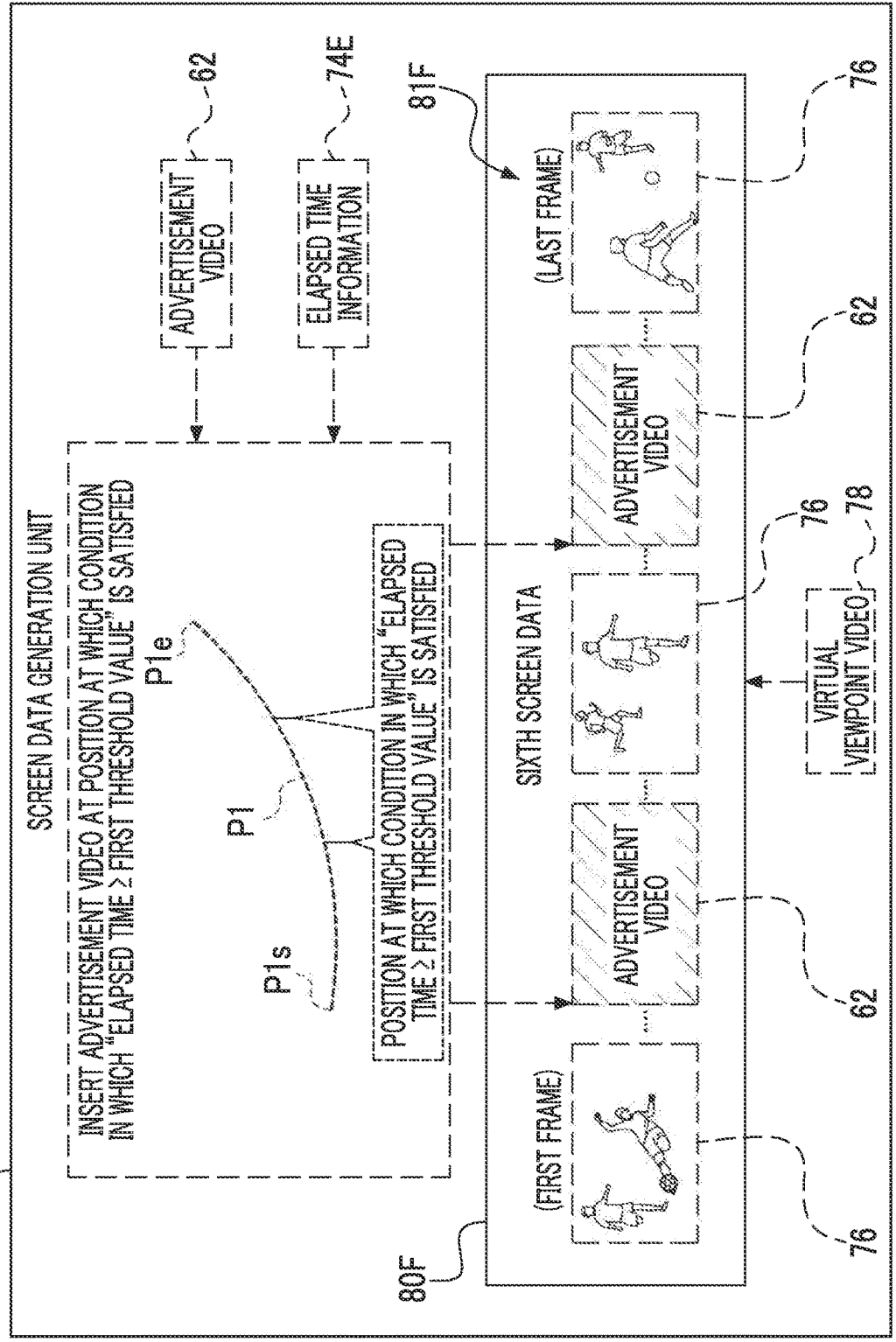
FIG. 17 is a conceptual diagram showing an example of contents of sixth screen data generated by the screen data generation unit.

As shown in FIG. 17 as an example, the screen data generation unit 28D generates the sixth screen data 80F including the virtual viewpoint video with advertisement inclusion 81F based on the advertisement video 62, the elapsed time information 74E, and the virtual viewpoint video 78. The sixth screen data 80F is data for displaying the virtual viewpoint video 78 on the display 18. In addition, the sixth screen data 80F may also be data for displaying the advertisement video 62 on the display 18 at a timing which is decided according to a relationship between the elapsed time indicated by the elapsed time information 74E and the position of the second viewpoint.

The screen data generation unit 28D generates the virtual viewpoint video with advertisement inclusion 81F such that the advertisement video 62 is displayed on the display 18 at a position at which the viewpoint is stationary, with reference to the elapsed time information 74E. For example, the screen data generation unit 28D generates the virtual viewpoint video with advertisement inclusion 81F by inserting the advertisement video 62 in the virtual viewpoint video 78 such that the advertisement video 62 is displayed on the display 18 at a position of the viewpoint, among the plurality of viewpoints included in the viewpoint path P1, at which a condition in which the elapsed time indicated by the elapsed time information 74E is equal to or longer than a first threshold value (for example, 5 seconds) is satisfied (for example, at a timing at which a condition in which the elapsed time is equal to or longer than the first threshold value is satisfied). It should be noted that the first threshold value may be a fixed value, or may be a variable value that is changed in response to the instruction received by the reception device 50 and/or various conditions.

Figure 18:
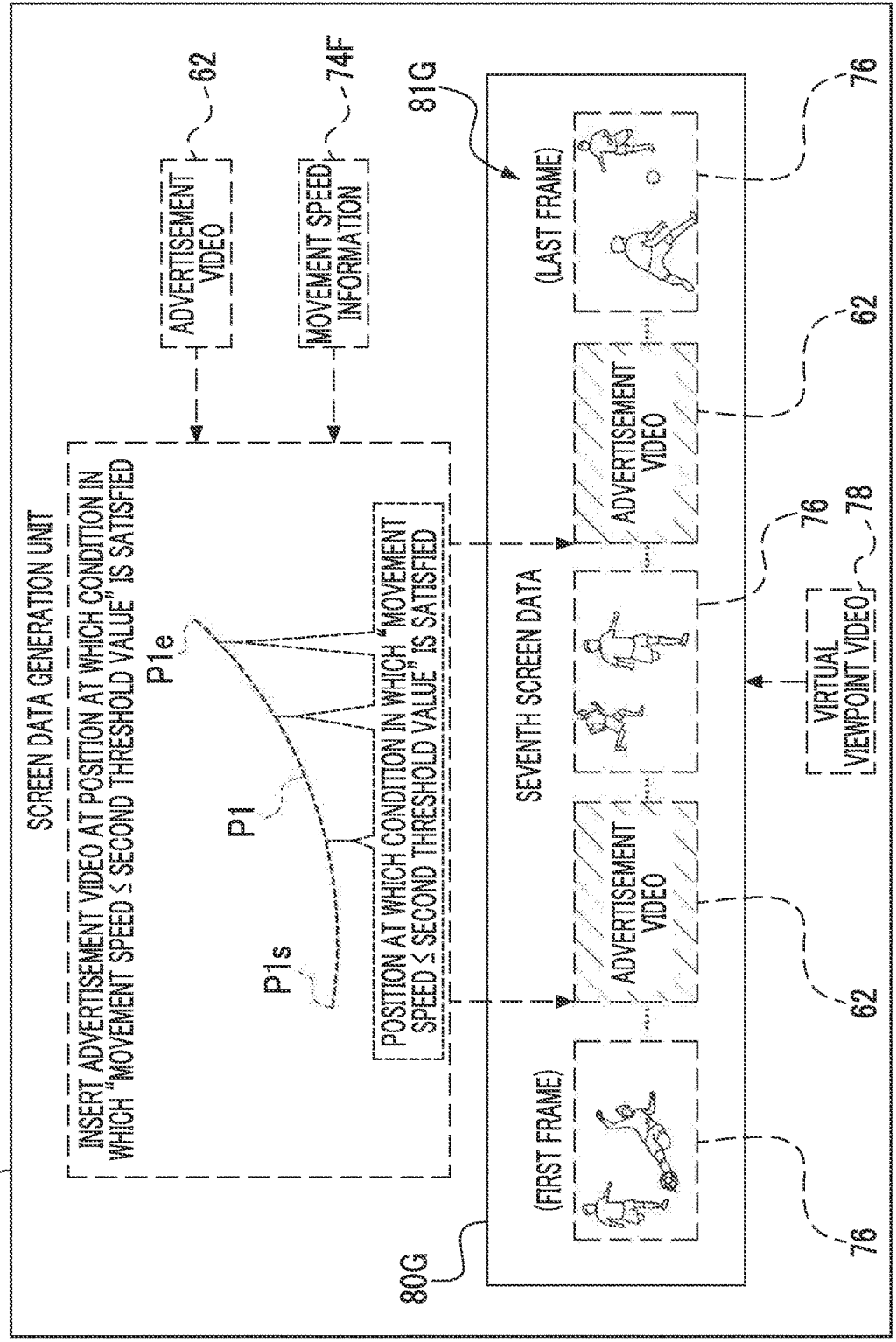
FIG. 18 is a conceptual diagram showing an example of contents of seventh screen data generated by the screen data generation unit.

As shown in FIG. 18 as an example, the screen data generation unit 28D generates the seventh screen data 80G including the virtual viewpoint video with advertisement inclusion 81G based on the advertisement video 62, the movement speed information 74F, and the virtual viewpoint video 78. The seventh screen data 80G is data for displaying the virtual viewpoint video 78 on the display 18. In addition, the seventh screen data 80G is also data for displaying the advertisement video 62 on the display 18 at a timing at which the movement speed specified from the movement speed information 74F is equal to or lower than a second threshold value. It should be noted that the second threshold value is an example of a "threshold value" according to the technology of the present disclosure.

The screen data generation unit 28D generates the virtual viewpoint video with advertisement inclusion 81F by inserting the advertisement video 62 in the virtual viewpoint video 78 such that the advertisement video 62 is displayed on the display 18 at a position of the viewpoint, among the plurality of viewpoints included in the viewpoint path P1, at which a condition in which the movement speed specified by the movement speed information 74F is equal to or large than the second threshold value (for example, 5 mm/second) is satisfied (for example, at a timing at which a condition in which the movement speed is equal to or higher than the second threshold value is satisfied). It should be noted that the second threshold value may be a fixed value, or may be a variable value that is changed in response to the instruction received by the reception device 50 and/or various conditions.

Figure 19:
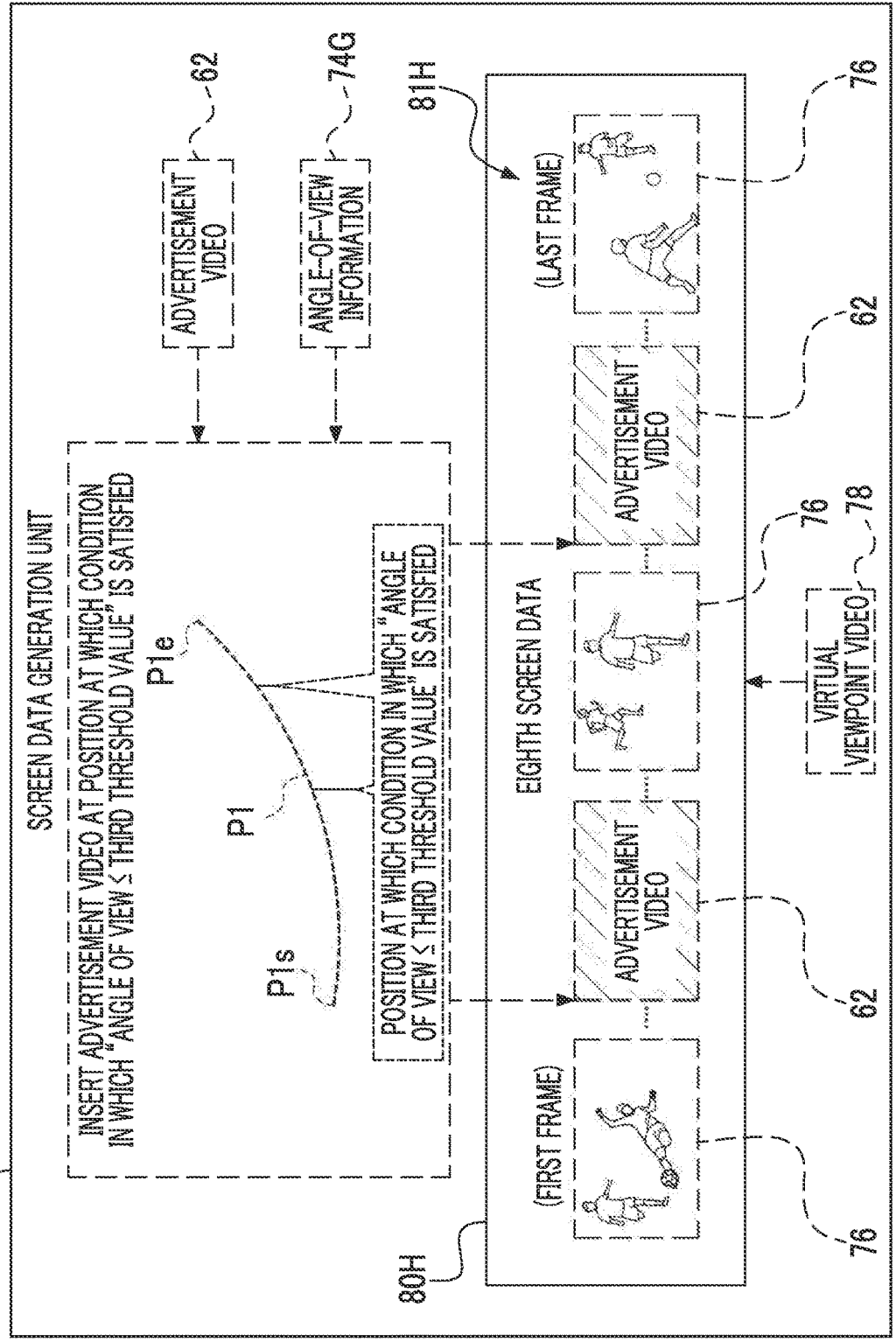
FIG. 19 is a conceptual diagram showing an example of contents of eighth screen data generated by the screen data generation unit.

As an example, as shown in FIG. 19, the screen data generation unit 28D generates the eighth screen data 80H including the virtual viewpoint video with advertisement inclusion 81H based on the advertisement video 62, the angle-of-view information 74G and the virtual viewpoint video 78. The eighth screen data 80H is data for displaying the virtual viewpoint video 78 on the display 18. In addition, the eighth screen data 80H is also data for displaying the advertisement video 62 on the display 18 at a timing which is decided according to the angle-of-view information 74G.

The screen data generation unit 28D generates the virtual viewpoint video with advertisement inclusion 81H by inserting the advertisement video 62 in the virtual viewpoint video 78 such that the advertisement video 62 is displayed on the display 18 at a position of the viewpoint, among the plurality of viewpoints included in the viewpoint path P1, at which the angle of view indicated by the angle-of-view information 74G is equal to or smaller than a third threshold value (for example, 40 degrees) (for example, at a timing at which the angle of view indicated by the angle-of-view information 74G is equal to or smaller than the third threshold value).

Here, the form example is described in which the virtual viewpoint video with advertisement inclusion 81H is generated such that the advertisement video 62 is displayed on the display 18 at the timing at which the angle of view indicated by the angle-of-view information 74G is equal to or smaller than the third threshold value, but the technology of the present disclosure is not limited to this. For example, the virtual viewpoint video with advertisement inclusion 81H may be generated such that the advertisement video 62 is displayed on the display 18 at a timing at which the angle of view indicated by the angle-of-view information 74G is equal to or larger than a fourth threshold value (for example, 110 degrees), or the virtual viewpoint video with advertisement inclusion 81H may be generated such that the advertisement video 62 is displayed on the display 18 at a timing at which the angle of view indicated by the angle-of-view information 74G is changed.

It should be noted that the third threshold value ad the fourth threshold value may be a fixed value, or may be a variable value that is changed in response to the instruction received by the reception device 50 and/or various conditions.

Hereinafter, an action of the image processing apparatus 10 will be described with reference to FIG. 20.

Figure 20:
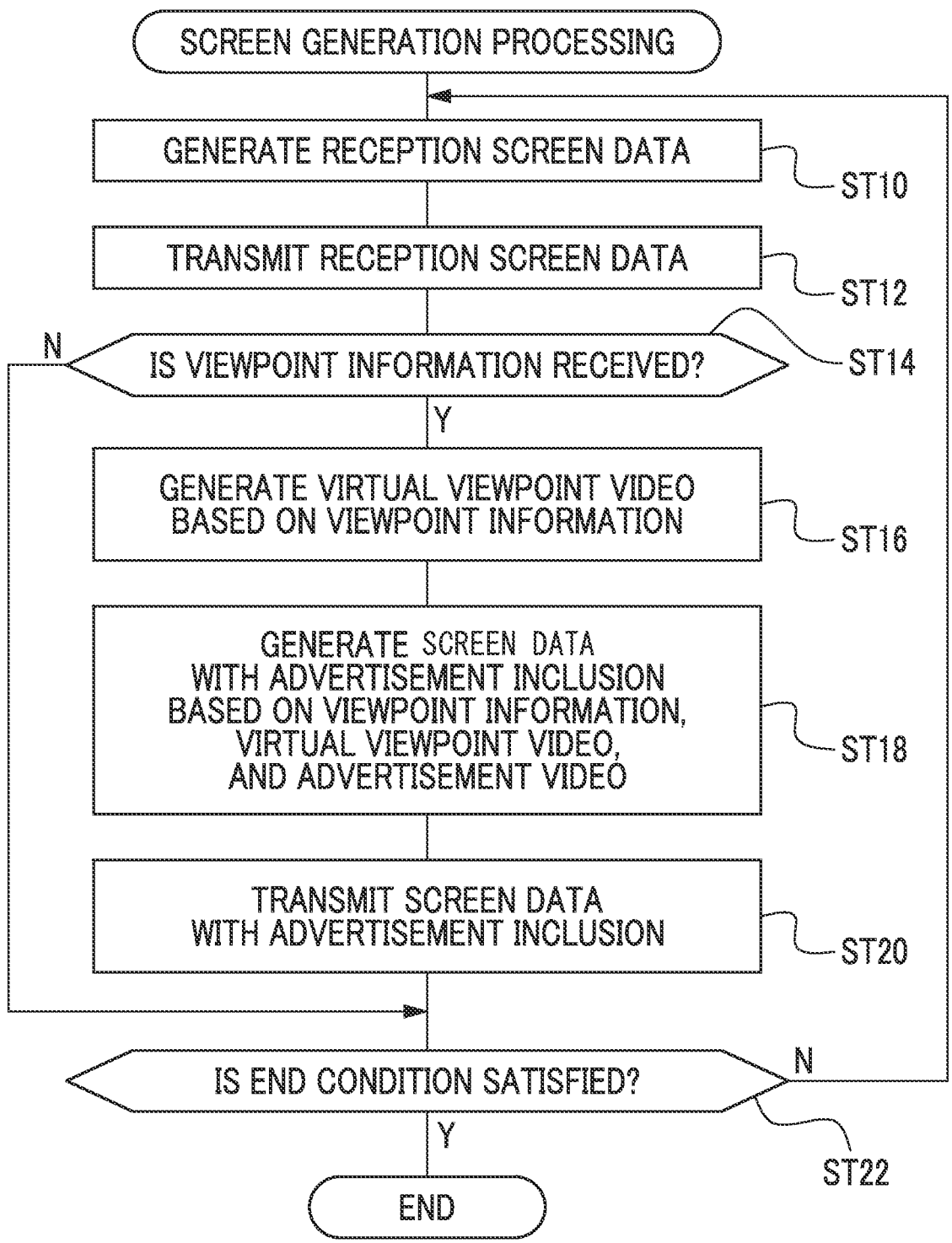
FIG. 20 is a flowchart showing an example of a flow of screen generation processing.

FIG. 20 shows an example of a flow of screen generation processing performed by the CPU 28 of the image processing apparatus 10. The flow of the screen generation processing shown in FIG. 20 is an example of an "image processing method" according to the technology of the present disclosure.

In the screen generation processing shown in FIG. 20, first, in step ST10, the reception screen generation unit 28A generates the reception screen data 70 based on the plurality of captured images 64 (see FIG. 4). After the processing of step ST10 is executed, the screen generation processing shifts to step ST12.

In step ST12, the output unit 28E transmits the reception screen data 70 generated by the reception screen generation unit 28A to the user device 12 via the transmission/reception device 24. After the processing of step ST12 is executed, the screen generation processing shifts to step ST14.

In a case in which the reception screen data 70 is transmitted from the image processing apparatus 10 to the user device 12 by executing the processing of step ST12, the user device 12 receives the reception screen data 70, and displays the reception screen 66 indicated by the received reception screen data 70 on the display 18 (see FIG. 4 to FIG. 6). In a case in which the reception screen 66 is displayed on the display 18 of the user device 12, the indications of the viewpoint, the gaze point, and the like are given to the user device 12 from the user 14 via the touch panel 20 (see FIG. 5 and FIG. 6). The CPU 52 of the user device 12 generates the viewpoint information 74 based on the viewpoint and the gaze point which are received by the touch panel 20, and transmits the generated viewpoint information 74 to the image processing apparatus 10 via the transmission/reception device 44 (see FIG. 7).

In step ST14, the viewpoint information acquisition unit 28B determines whether or not the viewpoint information 74 is received by the transmission/reception device 24. In step ST14, in a case in which the viewpoint information 74 is not received by the transmission/reception device 24, a negative determination is made, and the screen generation processing shifts to step ST22. In step ST14, in a case in which the viewpoint information 74 is received by the transmission/reception device 24, a positive determination is made, and the screen generation processing shifts to step ST16. The viewpoint information acquisition unit 28B acquires the viewpoint information 74 received by the transmission/reception device 24 (see FIG. 7).

In step ST16, the virtual viewpoint image generation unit 28C acquires the plurality of captured images 64 from the plurality of imaging apparatuses 36 according to the viewpoint information 74 acquired by the viewpoint information acquisition unit 28B. Then, the virtual viewpoint image generation unit 28C generates the virtual viewpoint video 78 based on the plurality of captured images 64 acquired from the plurality of imaging apparatuses 36 and the viewpoint information 74 acquired by the viewpoint information acquisition unit 28B. After the processing of step ST16 is executed, the screen generation processing shifts to step ST18.

In step ST18, the screen data generation unit 28D generates screen data with advertisement inclusion 80 based on the viewpoint information 74 (in step ST16, the viewpoint information 74 used for the generation of the virtual viewpoint video 78) acquired by the viewpoint information acquisition unit 28B, the virtual viewpoint video 78 generated in step ST16, and the advertisement video 62 stored in the NVM 30 (see FIG. 9 to FIG. 19). After the processing of step ST18 is executed, the screen generation processing shifts to step ST20.

In step ST20, the output unit 28E transmits the screen data with advertisement inclusion 80 generated in step ST18 to the user device 12 via the transmission/reception device 24 (see FIG. 9).

In a case in which the screen data with advertisement inclusion 80 is transmitted from the image processing apparatus 10 to the user device 12 by executing the processing of step ST20, the user device 12 receives the screen data with advertisement inclusion 80, and displays the virtual viewpoint video with advertisement inclusion 81 included in the received screen data with advertisement inclusion 80 on the virtual viewpoint video screen 68 of the display 18 (see FIG. 10). The virtual viewpoint video with advertisement inclusion 81 displayed on the virtual viewpoint video screen 68 is viewed by the user 14.

It should be noted that the virtual viewpoint video with advertisement inclusion 81 displayed on the virtual viewpoint video screen 68 may be any one or a plurality of the virtual viewpoint videos with advertisement inclusion 81A to 81H. Whether any one of the virtual viewpoint videos with advertisement inclusion 81A to 81H is displayed on the virtual viewpoint video screen 68 of the display 18 may be randomly decided, may be decided according to contents of the viewpoint information 74, or may be decided according to the number of times the user 14 views the virtual viewpoint video 78.

In step ST22, the output unit 28E determines whether or not a condition for ending the screen generation processing (hereinafter, referred to as an "end condition") is satisfied. A first example of the end condition is a condition in which an instruction to end the screen generation processing is received by the reception device 50 (see FIG. 2). A second example of the end condition includes a condition in which the communication between the image processing apparatus 10 and one or more imaging apparatuses 36 decided in advance among the plurality of imaging apparatuses 36 is cut off. A third example of the end condition is a condition in which a predetermined time (for example, 60 seconds) has elapsed without a positive determination made in step ST14.

In a case in which the end condition is not satisfied in step ST22, a negative determination is made, and the screen generation processing shifts to step ST10. In step ST22, in a case in which the end condition is satisfied, a positive determination is made, and the screen generation processing ends.

As described above, in the image processing apparatus 10, the virtual viewpoint video 78 and the advertisement video 62 and created in a process different from a process of the virtual viewpoint video 78 are displayed on the display 18 of the user device 12 based on the viewpoint information 74. Specifically, the virtual viewpoint video 78 is displayed on the display 18, and the advertisement video 62 is displayed on the display 18 at the timing which is decided according to the viewpoint information 74. Therefore, with the present configuration, the advertisement video 62 can be shown to the user 14 who is a viewer of the virtual viewpoint video 78.

In addition, in the image processing apparatus 10, the first screen data 80A is generated. The first screen data 80A is the data for displaying the virtual viewpoint video 78 on the display 18. In addition, the first screen data 80A is also the data for displaying the advertisement video 62 on the display 18 according to the total time information 74A. Therefore, with the present configuration, as compared to a case in which the advertisement video 62 is displayed on the display 18 depending only on the viewpoint, the advertisement video 62 can be easily displayed on the display 18 at a timing that is convenient for a side that provides the advertisement video 62 to the user 14 and/or for the user 14.

In addition, in the image processing apparatus 10, the second screen data 80B is generated. The second screen data 80B is the data for displaying the virtual viewpoint video 78 on the display 18. In addition, the second screen data 80B is the data for displaying the advertisement video 62 on the display 18 during the period from the completion of the setting of the viewpoint information 74 to displaying of the virtual viewpoint video 78 on the display 18 according to the setting completion information 74B. Therefore, with the present configuration, the advertisement video 62 can be shown to the user 14 during a period from the completion of the setting of the viewpoint information 74 to the viewing of the virtual viewpoint video 78 by the user 14.

In addition, in the image processing apparatus 10, the third screen data 80C is generated. The third screen data 80C is the data for displaying the virtual viewpoint video 78 on the display 18. In addition, the third screen data 80C is also data for displaying the advertisement video 62 on the display 18 according to the timing at which the continuity of the viewpoint information 74 is interrupted. Therefore, with the present configuration, the advertisement video 62 can be shown to the user 14 at the timing at which the continuity of the viewpoint information 74 is interrupted.

In addition, in the image processing apparatus 10, the fourth screen data 80D is generated. The fourth screen data 80D is the data for displaying the virtual viewpoint video 78 on the display 18. In addition, the fourth screen data 80D is also data for displaying the advertisement video 62 on the display 18 at the interval at which the viewpoint path P1 indicated by the viewpoint path information 74C is divided. Therefore, with the present configuration, the advertisement video 62 can be shown to the user 14 at each interval at which the viewpoint path P1 is divided.

In addition, in the image processing apparatus 10, the fifth screen data 80E is generated. The fifth screen data 80E is the data for displaying the virtual viewpoint video 78 on the display 18. In addition, the fifth screen data 80E is also data for displaying the advertisement video 62 on the display 18 at the interval at which the required time indicated by the required time information 74D is divided. Therefore, with the present configuration, the advertisement video 62 can be shown to the user 14 at each interval at which the time required for the viewpoint to move from the first position to the second position is divided.

In addition, in the image processing apparatus 10, the sixth screen data 80F is generated. The sixth screen data 80F is the data for displaying the virtual viewpoint video 78 on the display 18. In addition, the sixth screen data 80F may also be data for displaying the advertisement video 62 on the display 18 at the timing which is decided according to the relationship between the elapsed time indicated by the elapsed time information 74E and the position of the second viewpoint. Therefore, with the present configuration, the advertisement video 62 can be shown to the user 14 at the timing which is decided according to the relationship between the elapsed time indicated by the elapsed time information 74E and the position of the second viewpoint.

In addition, in the image processing apparatus 10, the seventh screen data 80G is generated. The seventh screen data 80G is the data for displaying the virtual viewpoint video 78 on the display 18. In addition, the seventh screen data 80G is also data for displaying the advertisement video 62 on the display 18 at the timing at which the movement speed specified from the movement speed information 74F is equal to or lower than a second threshold value. Therefore, with the present configuration, the advertisement video 62 can be shown to the user 14 at the timing at which the movement speed specified from the movement speed information 74F is equal to or lower than the second threshold value.

In addition, in the image processing apparatus 10, the eighth screen data 80H is generated. The eighth screen data 80H is the data for displaying the virtual viewpoint video 78 on the display 18. In addition, the eighth screen data 80H is also data for displaying the advertisement video 62 on the display 18 at the timing which is decided according to the angle-of-view information 74G Therefore, with the present configuration, the advertisement video 62 can be shown to the user 14 at the timing which is decided according to the angle-of-view information 74G.

It should be noted that, in the embodiment described above, the video created in the process different from the process of the virtual viewpoint video 78 (see FIG. 8 and the like) is described as an example of the advertisement video 62, but the technology of the present disclosure is not limited to this. For example, the advertisement video 62 may be a video created without using the plurality of captured images 64, and in this case as well, the same effect as the effect of the embodiment is obtained. In addition, the advertisement video 62 may be a video created in a process different from the process of the virtual viewpoint image 76 (see FIG. 8 and the like), and is created without using the plurality of captured images 64 (see FIG. 3, FIG. 4, and FIG. 8 and the like). Also, the advertisement video 62 may be a video created by using at least a part of the plurality of captured images 64. Moreover, the advertisement video 62 may be a video that is not affected by the plurality of imaging apparatuses 36, may be a video that does not depend on a RAW image obtained by imaging the subject by the plurality of imaging apparatuses 36, or may be a video that is irrelevant to the data obtained from the plurality of imaging apparatuses 36.

Figure 21:
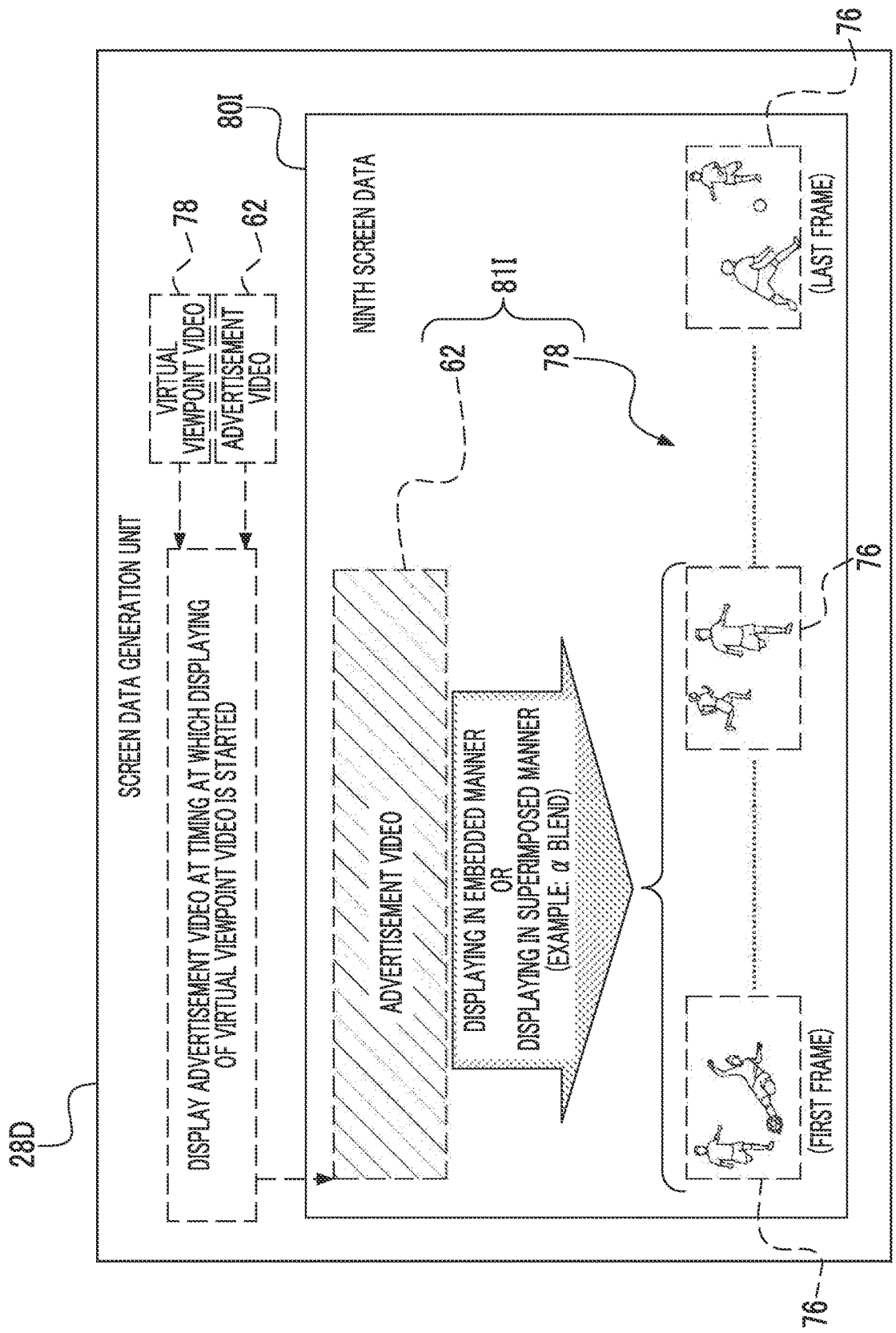
FIG. 21 is a conceptual diagram showing an example of contents of ninth screen data generated by the screen data generation unit.

In addition, in the embodiment described above, the form example is described in which the advertisement video 62 is inserted between the virtual viewpoint images 76, but the technology of the present disclosure is not limited to this. For example, the advertisement video 62 may be displayed in a superimposed manner on the virtual viewpoint video 78, or may be displayed in a state in which an advertisement image is embedded in the virtual viewpoint image 76. In this case, as shown in FIG. 21 as an example, the screen data generation unit 28D generates ninth screen data 80I including a virtual viewpoint video with advertisement inclusion 81I. The ninth screen data 80I is an example of "ninth data" according to the technology of the present disclosure.

The ninth screen data 80I is data for displaying the virtual viewpoint video 78 on the display 18. In addition, the ninth screen data 80I is also data for displaying the advertisement video 62 on the display 18 at a timing at which the displaying of the virtual viewpoint video 78 on the display 18 is started.

The screen data generation unit 28D generates the virtual viewpoint video with advertisement inclusion 81I by superimposing the advertisement video 62 on the virtual viewpoint video 78 such that the advertisement video 62 is displayed in a superimposed manner on the virtual viewpoint image 76 for a predetermined number of frames (for example, several hundred frames) from the virtual viewpoint image 76 of the first frame such that the advertisement video 62 is displayed on the display 18 at the timing at which the displaying of the virtual viewpoint video 78 on the display 18 is started. The displaying in a superimposed manner is realized by, for example, a-blend. The advertisement video 62 may be superimposed on the entirety of each virtual viewpoint image 76 included in the virtual viewpoint video with advertisement inclusion 81I, or may be superimposed on a part of each virtual viewpoint image 76.

Moreover, the screen data generation unit 28D may generate the virtual viewpoint video with advertisement inclusion 81I by embedding, in an order from the first frame, a plurality of advertisement images included in the advertisement video 62 to the virtual viewpoint image 76 for a predetermined number of frames (for example, several hundred frames) from the virtual viewpoint image 76 of the first frame such that the advertisement video 62 is displayed on the display 18 at the timing at which the displaying of the virtual viewpoint video 78 on the display 18 is started. The advertisement image need only be embedded in a part of the virtual viewpoint image 76.

The virtual viewpoint video with advertisement inclusion 81I generated in this manner is displayed on the display 18 of the user device 12. Therefore, with the present configuration, the advertisement video 62 can be shown to the user 14 who is the viewer of the virtual viewpoint video 78 at the timing at which the displaying of the virtual viewpoint video 78 is started. Alternatively, the virtual viewpoint video with advertisement inclusion 81I may be generated by embedding, in the order, the plurality of advertisement images included in the advertisement video 62 from the virtual viewpoint image 76 temporally backed by a predetermined number of frames with respect to the virtual viewpoint image 76 of the last frame to the virtual viewpoint image 76 of the last frame. With the present configuration, the advertisement video 62 can be shown to the user 14 who is the viewer of the virtual viewpoint video 78 around the timing at which the displaying of the virtual viewpoint video 78 ends.

Figure 22:
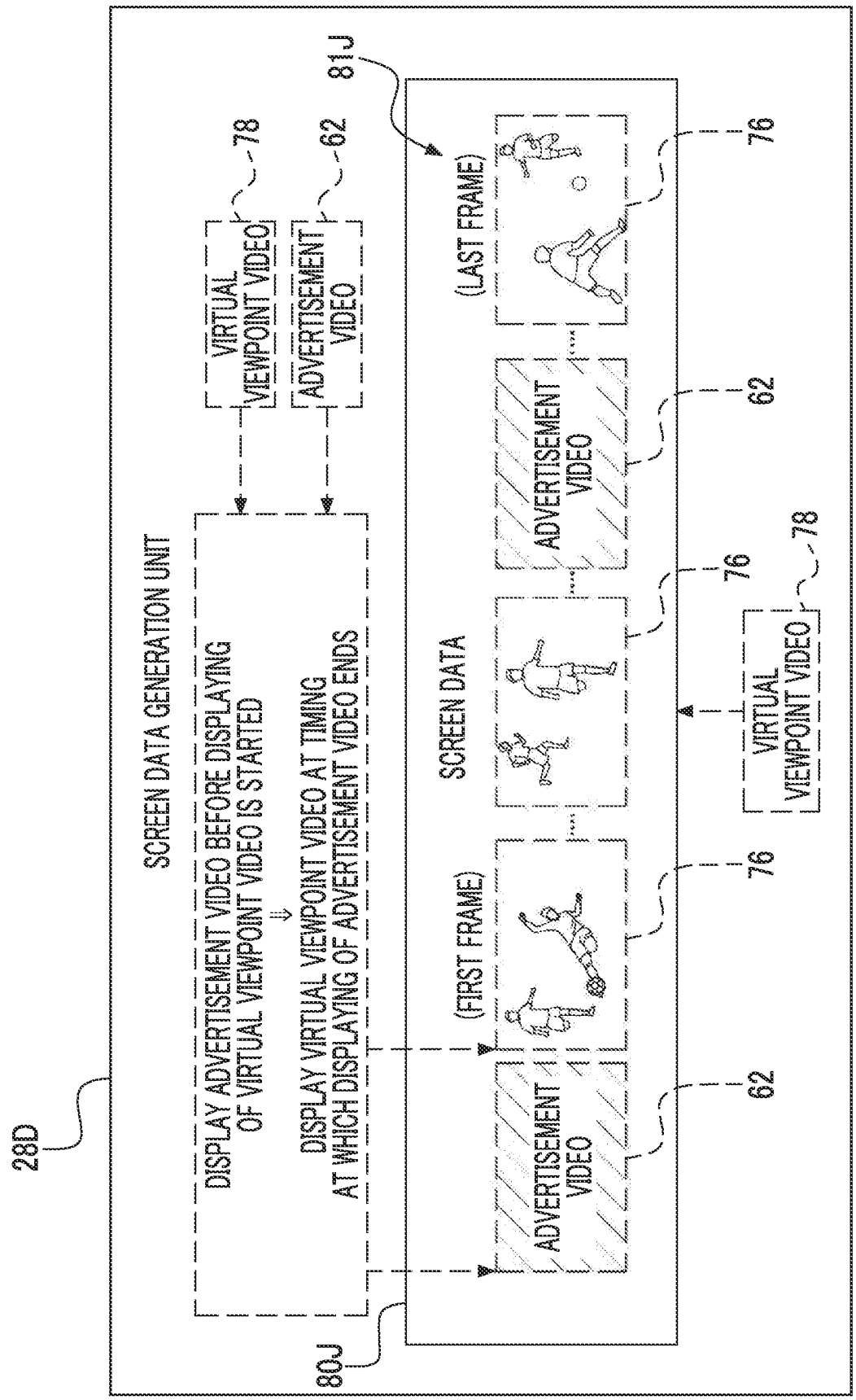
FIG. 22 is a conceptual diagram showing an example of contents of screen data generated by the screen data generation unit.

In addition, in the example shown in FIG. 21, the ninth screen data 80I for displaying the advertisement video 62 on the display 18 at the timing at which the displaying of the virtual viewpoint video 78 on the display 18 is started is described, but the technology of the present disclosure is not limited to this. For example, as shown in FIG. 22, screen data 80J including a virtual viewpoint video with advertisement inclusion 81J may be used instead of the ninth screen data 80I. The screen data 80J is an example of "ninth data" according to the technology of the present disclosure.

The screen data 80J is data for displaying the virtual viewpoint video 78 on the display 18. In addition, the screen data 80J is also data for displaying the virtual viewpoint video 78 on the display 18 at a timing at which the displaying of the advertisement video 62 on the display 18 ends. The screen data generation unit 28D generates the virtual viewpoint video with advertisement inclusion 81J by inserting the advertisement video 62 in the virtual viewpoint video 78 such that the advertisement video 62 is displayed on the display 18 before the displaying of the virtual viewpoint video 78 is started and the virtual viewpoint video 78 is displayed on the display 18 at the timing at which the displaying of the advertisement video 62 ends.

The virtual viewpoint video with advertisement inclusion 81J generated in this manner is displayed on the display 18 of the user device 12. Therefore, with the present configuration, the advertisement video 62 can be shown to the user 14 who is the viewer of the virtual viewpoint video 78 at a timing before the displaying of the virtual viewpoint video 78 is started. Similarly, the advertisement video 62 may be shown to the user 14 who is the viewer of the virtual viewpoint video 78 at a timing after the displaying of the virtual viewpoint video 78 ends.

It should be noted that at least one of the ninth screen data 80I or the screen data 80J may be included in the screen data with advertisement inclusion 80 (see FIG. 9) according to the embodiment described above.

In addition, the output unit 28E (see FIG. 4) may transmit at least one of the ninth screen data 80I or the screen data 80J to the user device 12 via the transmission/reception device 24 on a condition that the reception (see FIG. 4 to FIG. 7) of the viewpoint information 74 by the reception screen 66 indicated by the reception screen data 70 is completed. It should be noted that the reception screen data 70 is an example of "tenth data" according to the technology of the present disclosure.

The virtual viewpoint video with advertisement inclusion 81I included in the ninth screen data 80I is displayed on the display 18 of the user device 12 in a case in which the ninth screen data 80I is transmitted to the user device 12, and the virtual viewpoint video with advertisement inclusion 81J included in the screen data 80J is displayed on the display 18 of the user device 12 in a case in which the screen data 80J is transmitted to the user device 12. Therefore, with the present configuration, on the condition that the reception of the viewpoint information 74 by the reception screen 66 is completed, the advertisement video 62 can be shown to the user 14 who is the viewer of the virtual viewpoint video 78 at the timing at which the displaying of the virtual viewpoint video 78 is started.

Figure 23:
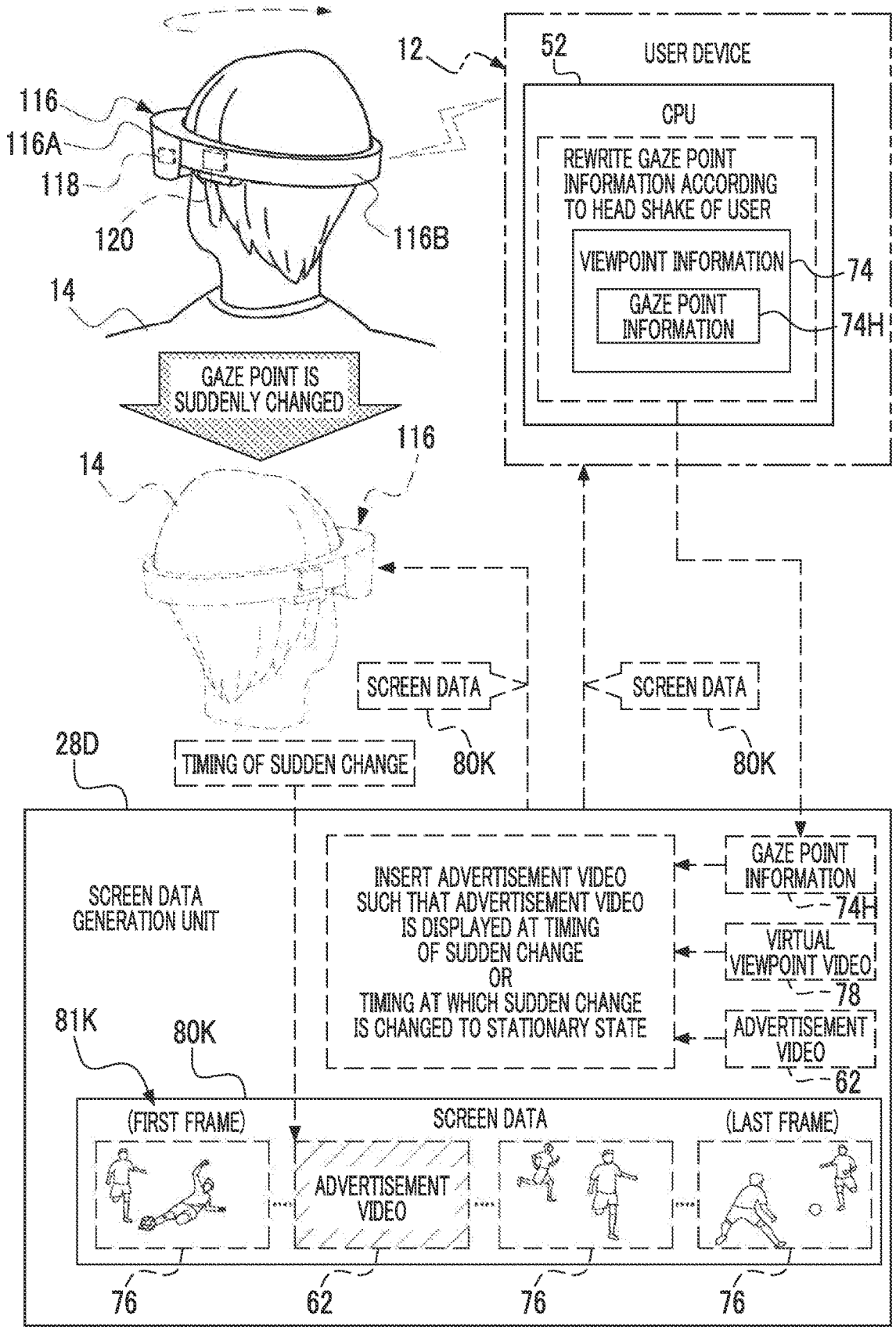
FIG. 23 is a conceptual diagram showing an example of processing contents of the image processing system in a case in which a gaze point is suddenly changed.

In addition, in the embodiment described above, the smartphone is described as an example of the user device 12, but the technology of the present disclosure is not limited to this, and the technology of the present disclosure is established even in a case in which an HMD 116 is applied instead of the user device 12, as shown in FIG. 23 as an example. In the example shown in FIG. 23, the HMD 116 comprises a body part 116A and a mounting part 116B. In a case in which the HMD 116 is mounted on the user 14, the body part 116A is positioned in front of the eyes of the user 14, and the mounting part 116B is positioned in the upper half of the head of the user 14. The mounting part 116B is a band-shaped member having a width of about several centimeters, and is fixed in a state of being in close contact with the upper half of the head of the user 14.

The body part 116A comprises various electric system devices. Examples of the various electric system devices include a transmission/reception device corresponding to the transmission/reception device 44 of the user device 12, a display body corresponding to the display 18 of the user device 12, a gyro sensor 118, and a computer 120 corresponding to the computer 40 of the user device 12.

The HMD 116 is used together with the user device 12. That is, the HMD 116 is connected to the user device 12 in a communicable manner, and various types of information are exchanged between the HMD 116 and the user device 12.

The reception screen 66 and the virtual viewpoint video screen 68 are displayed on the display body of the HMD 116 as in the display 18 of the user device 12. On the reception screen 66, for example, the viewpoint (for example, the viewpoint path P1) and the gaze point GP (see FIG. 6) set by the user 14 using the user device 12 are displayed.

The gyro sensor 118 detects an angular velocity of the HMD 116. The CPU 52 of the user device 12 changes contents of the gaze point information 74H included in the viewpoint information 74. That is, the gaze point GP indicated by the gaze point information 74H is changed according to the angular velocity detected by the gyro sensor 118. For example, in a case in which the user 14 shakes his/her head to the right side at a speed equal to or higher than a predetermined value (for example, 1 m/s), the CPU 52 of the user device 12 controls the display 18 and the HMD 116 such that the gaze point GP in the reception screen 66 is displaced to the right side by a predetermined amount (for example, several millimeters), and rewrites the gaze point information 74H with information indicating a position of the gaze point GP after the displacement.

The screen data generation unit 28D generates screen data 80K including a virtual viewpoint video with advertisement inclusion 81K. The screen data generation unit 28D controls the display timing of the advertisement video 62 according to a fluctuation state of the gaze point GP (see FIG. 6) specified from the gaze point information 74H. For example, the screen data generation unit 28D generates the virtual viewpoint video with advertisement inclusion 81K by inserting the advertisement video 62 in the virtual viewpoint video 78 such that the advertisement video 62 is displayed on the display 18 of the user device 12 and the display body of the HMD 116 at a timing at which the gaze point GP is suddenly changed, that is, a timing at which the user 14 shakes his/her head to the right side or the left side at the speed equal to or higher than the predetermined value.

As a result, the advertisement video 62 is displayed on the display 18 of the user device 12 and the display body of the HMD 116 at the timing in which the user 14 shakes his/her head to the right side or the left side at the speed equal to or higher than the predetermined value. Therefore, with the present configuration, the advertisement video 62 of which the display timing is changed according to the fluctuation state of the gaze point GP (see FIG. 6) can be shown to the user 14 who is the viewer of the virtual viewpoint video 78.

It should be noted that, here, the example is described in which the user 14 shakes the head to the right side or the left side at the speed equal to or higher than the predetermined value is described, but the direction in which the user 14 shakes the head may be a direction other than the right side and the left side. In addition, in a case in which the gyro sensor and/or an acceleration sensor is mounted on the user device 12, the gaze point GP may be changed as in the HMD 116 by shaking the user device 12. In this case as well, the display timing of the advertisement video 62 may be controlled as in the HMD 116 according to the fluctuation state of the gaze point GP.

In addition, here, the form example is described in which the advertisement video 62 is displayed on the display 18 of the user device 12 and the display body of the HMD 116 at the timing at which the gaze point GP is suddenly changed, but the technology of the present disclosure is not limited to this. For example, the advertisement video 62 may be displayed on the display 18 of the user device 12 and the display body of the HMD 116 at a timing at which the gaze point GP is stationary from the sudden change.

In addition, here, the form example is described in which the virtual viewpoint video with advertisement inclusion 81K is displayed on both the display 18 of the user device 12 and the display body of the HMD 116, but the technology of the present disclosure is not limited to this, and the virtual viewpoint video with advertisement inclusion 81K need only be displayed on at least the display body of the HMD 116 out of the display 18 of the user device 12 and the display body of the HMD 116.

In addition, here, the form example is described in which the user device 12 and the HMD 116 are used in combination, but the screen data 80K may be generated by the user device 12 or the HMD 116, and the generated screen data 80K may be transmitted to the image processing apparatus 10.

In addition, here, the form example is described in which the sudden change of the gaze point GP is detected by using the gyro sensor 118, but the technology of the present disclosure is not limited to this, and the acceleration sensor and/or an eye tracker may be used together with the gyro sensor 118 or instead of the gyro sensor 118 to detect the sudden change of the gaze point GP. In a case in which the eye tracker is used, the movement of eyeballs of the user 14 need only be detected to display the advertisement video 62 on at least the display body of the HMD 116 out of the display 18 of the user device 12 and the display body of the HMD 116 at a timing at which it is detected that the eyeballs are moved by a specific amount (for example, 5 millimeters) within a specific time (for example, 1 second).

Figure 24:
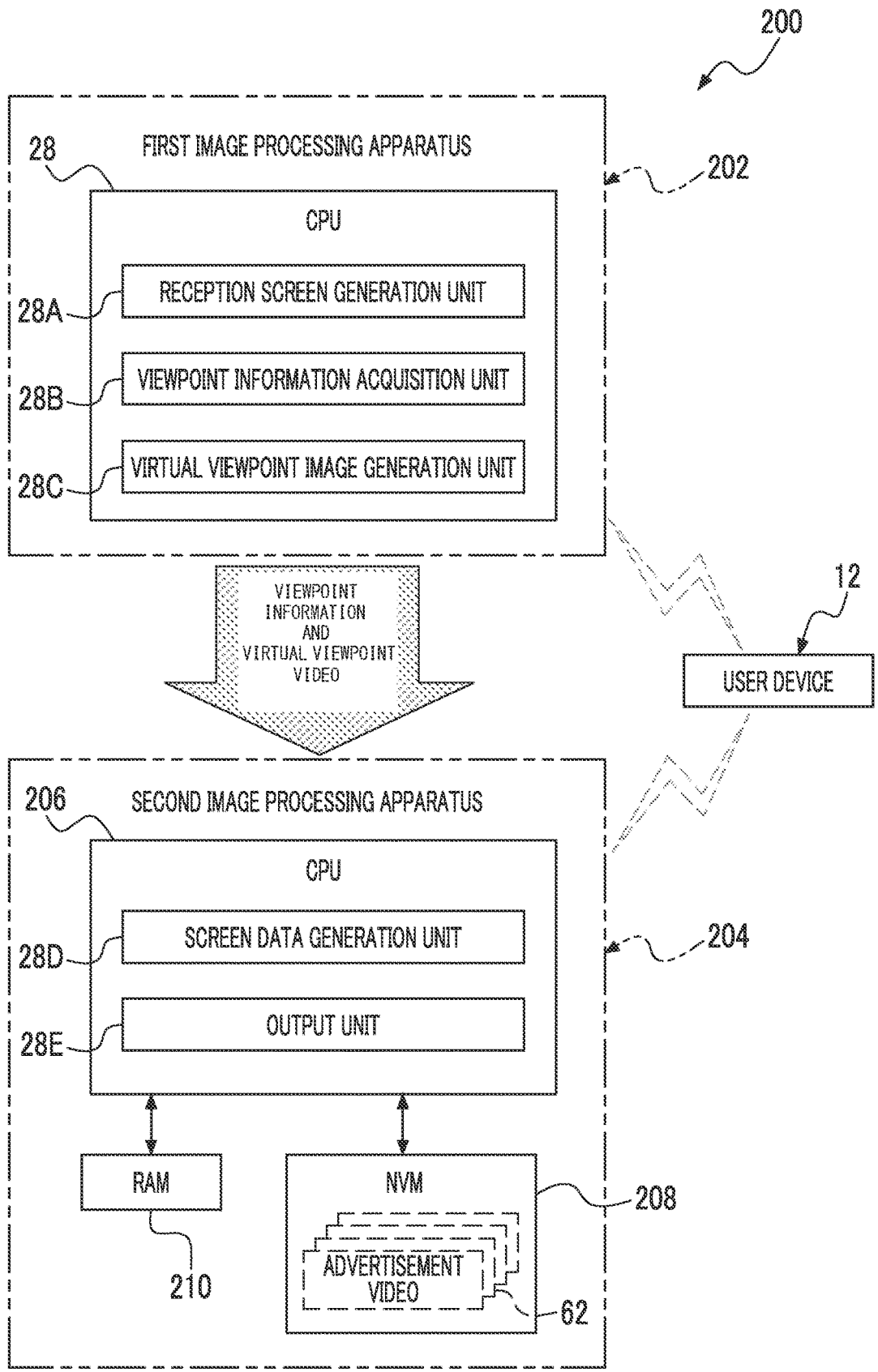
FIG. 24 is a conceptual diagram showing a modification example of the configuration of the image processing system.

In the embodiment described above, the form example is described in which the screen generation processing is executed by the image processing apparatus 10. However, the screen generation processing may be executed by a plurality of apparatuses in a distributed manner. In this case, for example, as shown in FIG. 24, an image processing system 200 is used instead of the image processing system 2 according to the embodiment described above. The image processing system 200 comprises the user device 12, a first image processing apparatus 202, and a second image processing apparatus 204, and is connected to each other in a communicable manner. It should be noted that the first image processing apparatus 202 and the second image processing apparatus 204 are examples of an "image processing apparatus" according to the technology of the present disclosure.

The hardware configuration of the electric system of the first image processing apparatus 202 is the same as the hardware configuration of the image processing apparatus 10 according to the embodiment described above. The CPU 28 of the first image processing apparatus 202 is operated as the reception screen generation unit 28A, the viewpoint information acquisition unit 28B, and the virtual viewpoint image generation unit 28C, as in the embodiment described above. The viewpoint information acquisition unit 28B transmits the viewpoint information 74 (see FIG. 7 and FIG. 8) to the second image processing apparatus 204, and the virtual viewpoint image generation unit 28C transmits the virtual viewpoint video 78 to the second image processing apparatus 204. The second image processing apparatus 204 receives the viewpoint information 74 transmitted from the viewpoint information acquisition unit 28B, and the virtual viewpoint video 78 transmitted from the virtual viewpoint image generation unit 28C.

The second image processing apparatus 204 comprises a computer including a CPU 206, an NVM 208, and a RAM 210. The plurality of advertisement videos 62 are stored in the NVM 208. The CPU 206 is operated as the screen data generation unit 28D and the output unit 28E according to the embodiment described above. The screen data generation unit 28D generates the screen data with advertisement inclusion 80 (see FIG. 9) based on the viewpoint information 74, the virtual viewpoint video 78, and the advertisement video 62. The output unit 28E transmits the screen data with advertisement inclusion 80 generated by the screen data generation unit 28D to the user device 12. The virtual viewpoint video with advertisement inclusion 81 (see FIG. 10) included in the screen data with advertisement inclusion 80 is displayed on the display 18 of the user device 12, and the virtual viewpoint video with advertisement inclusion 81 is viewed by the user 14. Therefore, even in a case in which the screen generation processing is performed in a distributed manner by the first image processing apparatus 202 and the second image processing apparatus 204, each effect according to the embodiment described above can be obtained.

In addition, in the embodiment described above, the virtual viewpoint image generation unit 28C generates the virtual viewpoint image 76, which is the image showing the aspect of the subject in a case in which the subject is observed from the viewpoint specified by the viewpoint information 74, based on the plurality of captured images 64 and the viewpoint information 74. However, the technology of the present disclosure is not limited to this, and the virtual viewpoint image generation unit 28C may cause an external device (for example, a server) connected to the image processing apparatus 10 in a communicable manner to generate the virtual viewpoint image 76, and may acquire the virtual viewpoint image 76 from the external device.

In addition, in the embodiment described above, the computer 22 is described as an example, but the technology of the present disclosure is not limited to this. For example, instead of the computer 22, a device including an ASIC, an FPGA, and/or a PLD may be applied. Moreover, instead of the computer 22, a hardware configuration and a software configuration may be used in combination. The same applies to the computer 40 of the user device 12.

Figure 25:
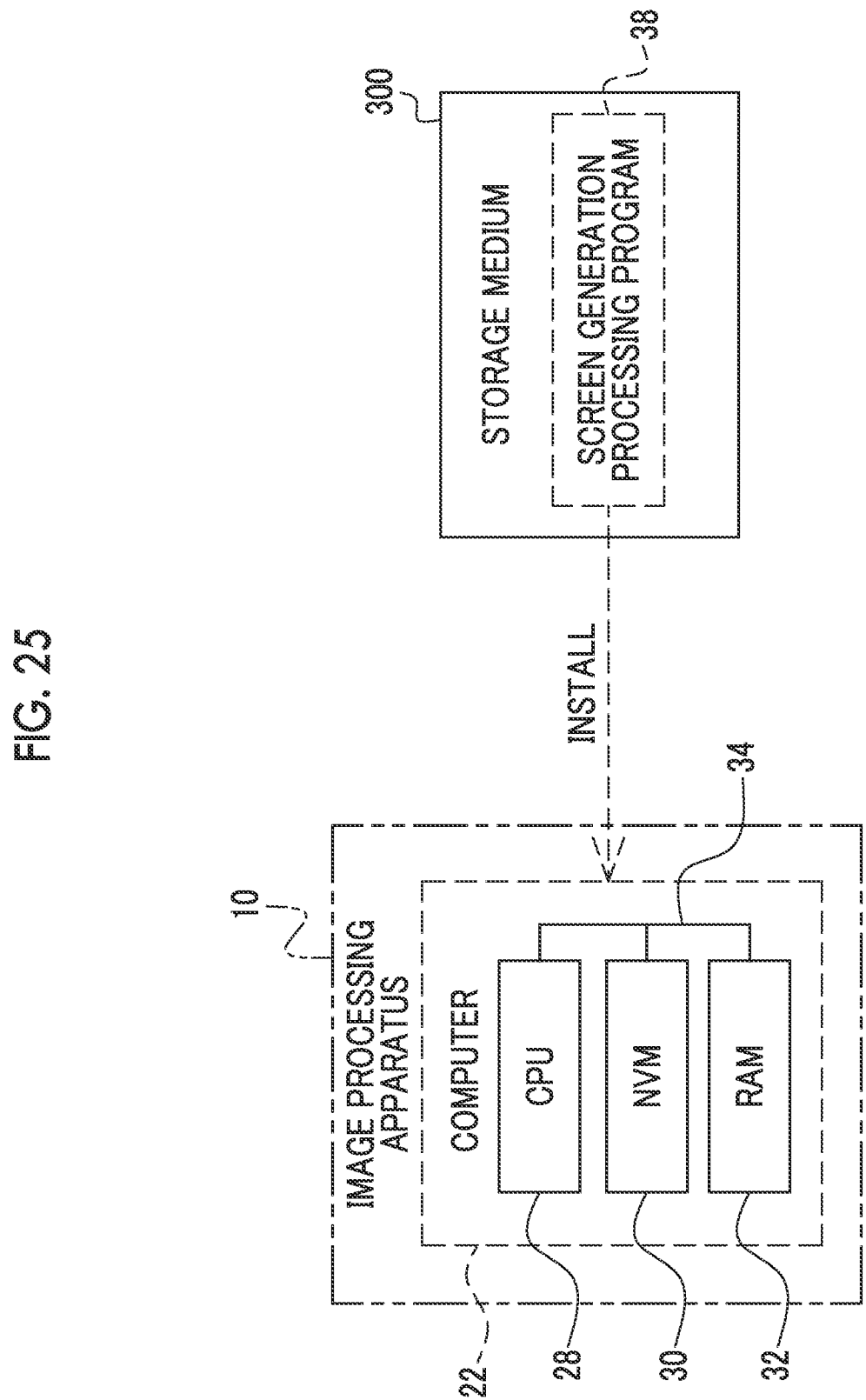
FIG. 25 is a conceptual diagram showing an example of an aspect in which a screen generation processing program stored in a storage medium is installed in a computer of the image processing apparatus.

In addition, in the embodiment described above, the screen generation processing program 38 is stored in the NVM 30, but the technology of the present disclosure is not limited to this, and as shown in FIG. 25 as an example, the screen generation processing program 38 may be stored in any portable storage medium 300, such as an SSD or a USB memory, which is a non-transitorily storage medium. In this case, by installing the screen generation processing program 38 stored in the storage medium 300 in the computer 22, and the CPU 28 executes the screen generation processing according to the screen generation processing program 38.

In addition, the screen generation processing program 38 may be stored in a memory of another computer, a server device, or the like connected to the computer 22 via a communication network (not shown), and the screen generation processing program 38 may be downloaded to the image processing apparatus 10 in response to a request from the image processing apparatus 10. In this case, the screen generation processing is executed by the CPU 28 of the computer 22 according to the downloaded screen generation processing program 38.

In addition, although the CPU 28 is described as an example in the embodiment described above, at least one CPU, at least one GPU, and/or at least TPU may be used instead of the CPU 28 or together with the CPU 28.

The following various processors can be used as a hardware resource for executing the screen generation processing. As described above, examples of the processor include the CPU, which is a general-purpose processor that functions as the hardware resource for executing the screen generation processing according to software, that is, the program. In addition, another example of the processor includes a dedicated electric circuit which is a processor having a circuit configuration specially designed for executing the dedicated processing, such as the FPGA, the PLD, or the ASIC. The memory is built in or connected to any processor, and any processor executes the screen generation processing by using the memory.

The hardware resource for executing the screen generation processing may be configured by one of these various processors, or may be configured by a combination (for example, a combination of a plurality of FPGAs or a combination of the CPU and the FPGA) of two or more processors of the same type or different types. In addition, the hardware resource for executing the screen generation processing may be one processor.

A first example in which the hardware resource is configured by one processor is a form in which one processor is configured by a combination of one or more CPUs and software, and the processor functions as the hardware resource for executing the screen generation processing, as represented by a computer, such as a client and a server. A second example thereof is a form in which a processor that realizes the functions of the entire system including a plurality of hardware resources for executing the screen generation processing with one IC chip is used, as represented by SoC. As described above, the screen generation processing is realized by using one or more of the various processors as the hardware resources.

Further, as the hardware structures of these various processors, more specifically, an electric circuit in which circuit elements, such as semiconductor elements, are combined can be used.

Also, the screen generation processing described above is merely an example. Therefore, it is needless to say that unnecessary steps may be deleted, new steps may be added, or the processing order may be changed within a range that does not deviate from the gist.

The described contents and the shown contents are the detailed description of the parts according to the technology of the present disclosure, and are merely examples of the technology of the present disclosure. For example, the description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the described contents and the shown contents within a range that does not deviate from the gist of the technology of the present disclosure. In addition, in order to avoid complications and facilitate understanding of the parts according to the technology of the present disclosure, the description of common technical knowledge or the like, which does not particularly require the description for enabling the implementation of the technology of the present disclosure, is omitted in the described contents and the shown contents.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. An image processing apparatus comprising:
a processor; and
a memory connected to or built in the processor,
wherein the processor
acquires a virtual viewpoint image showing an aspect of a subject in a case in which the subject is observed from a viewpoint specified by viewpoint information based on a plurality of captured images and the viewpoint information, and
outputs data for displaying a specific image created in a process different from a process of the virtual viewpoint image, and the virtual viewpoint image on a display based on the viewpoint information,
wherein the viewpoint information includes viewpoint path information indicating a viewpoint path for observing the subject, and
wherein the data includes primary data for displaying the virtual viewpoint image on the display and for displaying the specific image on the display at an interval at which the viewpoint path indicated by the viewpoint path information is divided.

2. The image processing apparatus according to claim 1, wherein the viewpoint information includes a time parameter related to a time, and
the data further includes first data for displaying the virtual viewpoint image on the display and for displaying the specific image on the display according to the time parameter.

3. The image processing apparatus according to claim 1, wherein the viewpoint information includes setting completion information indicating that setting of the viewpoint information is completed, and
the data further includes second data for displaying the virtual viewpoint image on the display and for displaying the specific image on the display during a period from completion of the setting of the viewpoint information to displaying of the virtual viewpoint image on the display according to the setting completion information.

4. The image processing apparatus according to claim 1, wherein the data further includes third data for displaying the virtual viewpoint image on the display and for displaying the specific image on the display according to a timing at which continuity of the viewpoint information is interrupted.

5. The image processing apparatus according to claim 1, wherein the viewpoint information includes required time information indicating a required time which is required for a first viewpoint for observing the subject to move from a first position to a second position different from the first position, and
the data further includes fifth data for displaying the virtual viewpoint image on the display and for displaying the specific image on the display at an interval at which the required time indicated by the required time information is divided.

6. The image processing apparatus according to claim 1, wherein the viewpoint information includes elapsed time information indicating a position of a second viewpoint for observing the subject and an elapsed time corresponding to the position of the second viewpoint, and
the data further includes sixth data for displaying the virtual viewpoint image on the display and for displaying the specific image on the display at a timing which is decided according to a relationship between the elapsed time and the position of the second viewpoint indicated by the elapsed time information.

7. The image processing apparatus according to claim 1, wherein the viewpoint information includes movement speed information for specifying a movement speed of a position of a third viewpoint for observing the subject, and
the data further includes seventh data for displaying the virtual viewpoint image on the display and for displaying the specific image on the display at a timing at which the movement speed specified from the movement speed information is equal to or lower than a threshold value.

8. The image processing apparatus according to claim 1,
wherein the viewpoint information includes angle-of-view information related to an angle of view for observing the subject, and
the data further includes eighth data for displaying the virtual viewpoint image on the display and for displaying the specific image on the display at a timing which is decided according to the angle-of-view information.

9. The image processing apparatus according to claim 1, wherein the data further includes
ninth data for displaying the virtual viewpoint image on the display and for displaying the specific image on the display at a timing at which displaying of the virtual viewpoint image on the display is started, or
ninth data for displaying the virtual viewpoint image on the display and for displaying the virtual viewpoint image on the display at a timing at which displaying of the specific image on the display ends.

10. The image processing apparatus according to claim 9, wherein the processor
further outputs tenth data for displaying a reception screen for receiving the viewpoint information on the display, and
outputs the data including the ninth data on a condition that reception of the viewpoint information by the reception screen is completed.

11. The image processing apparatus according to claim 1, wherein the processor
further acquires gaze point information for specifying a position of a gaze point, and
controls a display timing of the specific image according to a fluctuation state of the gaze point specified from the gaze point information.

12. An image processing apparatus comprising:
a processor; and
a memory connected to or built in the processor,
wherein the processor
acquires a virtual viewpoint image showing an aspect of a subject in a case in which the subject is observed from a viewpoint specified by viewpoint information based on a plurality of captured images and the viewpoint information, and
outputs data for displaying a specific image created without using the plurality of captured images, and the virtual viewpoint image on a display based on the viewpoint information,
wherein the viewpoint information includes viewpoint path information indicating a viewpoint path for observing the subject, and
wherein the data includes primary data for displaying the virtual viewpoint image on the display and for displaying the specific image on the display at an interval at which the viewpoint path indicated by the viewpoint path information is divided.

13. An image processing apparatus comprising:
a processor; and
a memory connected to or built in the processor,
wherein the processor
acquires a virtual viewpoint image showing an aspect of a subject in a case in which the subject is observed from a viewpoint specified by viewpoint information based on a plurality of captured images and the viewpoint information, and
outputs data for displaying the virtual viewpoint image on a display and outputs data for displaying a specific image on the display at a timing which is decided according to the viewpoint information,
wherein the viewpoint information includes viewpoint path information indicating a viewpoint path for observing the subject, and
wherein the data includes primary data for displaying the virtual viewpoint image on the display and for displaying the specific image on the display at an interval at which the viewpoint path indicated by the viewpoint path information is divided.

14. An image processing method comprising:
acquiring a virtual viewpoint image showing an aspect of a subject in a case in which the subject is observed from a viewpoint specified by viewpoint information based on a plurality of captured images generated by imaging the subject by a plurality of imaging apparatuses and the viewpoint information; and
outputting data for displaying a specific image created in a process different from a process of the virtual viewpoint image, and the virtual viewpoint image on a display based on the viewpoint information,
wherein the viewpoint information includes viewpoint path information indicating a viewpoint path for observing the subject, and
wherein the data includes primary data for displaying the virtual viewpoint image on the display and for displaying the specific image on the display at an interval at which the viewpoint path indicated by the viewpoint path information is divided.

15. An image processing method comprising:
acquiring a virtual viewpoint image showing an aspect of a subject in a case in which the subject is observed from a viewpoint specified by viewpoint information based on a plurality of captured images and the viewpoint information; and
outputting, based on the viewpoint information, data for displaying a specific image created without using the plurality of captured images, and the virtual viewpoint image on a display based on the viewpoint information,
wherein the viewpoint information includes viewpoint path information indicating a viewpoint path for observing the subject, and
wherein the data includes primary data for displaying the virtual viewpoint image on the display and for displaying the specific image on the display at an interval at which the viewpoint path indicated by the viewpoint path information is divided.

16. An image processing method comprising:
acquiring a virtual viewpoint image showing an aspect of a subject in a case in which the subject is observed from a viewpoint specified by viewpoint information based on a plurality of captured images and the viewpoint information;
outputting data for displaying the virtual viewpoint image on a display; and
outputting data for displaying a specific image on the display at a timing which is decided according to the viewpoint information,
wherein the viewpoint information includes viewpoint path information indicating a viewpoint path for observing the subject, and
wherein the data includes primary data for displaying the virtual viewpoint image on the display and for displaying the specific image on the display at an interval at which the viewpoint path indicated by the viewpoint path information is divided.

17. A non-transitory computer-readable storage medium storing a program executable by a computer to perform a process comprising:

acquiring a virtual viewpoint image showing an aspect of a subject in a case in which the subject is observed from a viewpoint specified by viewpoint information based on a plurality of captured images and the viewpoint information; and outputting data for displaying a specific image created in a process different from a process of the virtual viewpoint image and the virtual viewpoint image on a display based on the viewpoint information, wherein the viewpoint information includes viewpoint path information indicating a viewpoint path for observing the subject, and wherein the data includes primary data for displaying the virtual viewpoint image on the display and for displaying the specific image on the display at an interval at which the viewpoint path indicated by the viewpoint path information is divided.

18. A non-transitory computer-readable storage medium storing a program executable by a computer to perform a process comprising:

acquiring a virtual viewpoint image showing an aspect of a subject in a case in which the subject is observed from a viewpoint specified by viewpoint information based on a plurality of captured images and the viewpoint information; and outputting data for displaying a specific image created without using the plurality of captured images and the virtual viewpoint image on a display based on the viewpoint information, wherein the viewpoint information includes viewpoint path information indicating a viewpoint path for observing the subject, and wherein the data includes primary data for displaying the virtual viewpoint image on the display and for displaying the specific image on the display at an interval at which the viewpoint path indicated by the viewpoint path information is divided.

19. A non-transitory computer-readable storage medium storing a program executable by a computer to perform a process comprising:

acquiring a virtual viewpoint image showing an aspect of a subject in a case in which the subject is observed from a viewpoint specified by viewpoint information based on a plurality of captured images and the viewpoint information; and outputting data for displaying the virtual viewpoint image on a display and outputting data for displaying a specific image on the display at a timing which is decided according to the viewpoint information, wherein the viewpoint information includes viewpoint path information indicating a viewpoint path for observing the subject, and wherein the data includes primary data for displaying the virtual viewpoint image on the display and for displaying the specific image on the display at an interval at which the viewpoint path indicated by the viewpoint path information is divided.

* * * * *